United States Patent
Bang et al.

(10) Patent No.: US 11,294,708 B2
(45) Date of Patent: Apr. 5, 2022

(54) DATA STRUCTURE EXECUTION FRAMEWORK USING VIRTUAL COMPUTING DOMAINS

(71) Applicant: SAP SE, Walldorf (DE)

(72) Inventors: Tiemo Bang, Hockenheim (DE); Norman May, Karlsruhe (DE); Ismail Oukid, Berlin (DE); Carsten Binnig, Mosbach (DE)

(73) Assignee: SAP SE, Walldorf (DE)

( * ) Notice: Subject to any disclaimer, the term of this patent is extended or adjusted under 35 U.S.C. 154(b) by 152 days.

(21) Appl. No.: 16/712,728

(22) Filed: Dec. 12, 2019

(65) Prior Publication Data

US 2021/0182097 A1    Jun. 17, 2021

(51) Int. Cl.
| G06F 9/46 | (2006.01) |
|---|---|
| G06F 9/48 | (2006.01) |
| G06F 9/455 | (2018.01) |
| G06F 9/50 | (2006.01) |

(52) U.S. Cl.
CPC ........ *G06F 9/4843* (2013.01); *G06F 9/45558* (2013.01); *G06F 9/5016* (2013.01); *G06F 9/5077* (2013.01); *G06F 2009/45562* (2013.01); *G06F 2209/485* (2013.01)

(58) Field of Classification Search
CPC .. G06F 9/4843; G06F 9/45558; G06F 9/5016; G06F 9/5077; G06F 2009/45562; G06F 2209/485
See application file for complete search history.

(56) References Cited

U.S. PATENT DOCUMENTS 8,893,267 B1    11/2014    Sathe et al.

FOREIGN PATENT DOCUMENTS

| EP | 3 163442 | 5/2017 |
|---|---|---|
| EP | 3 547201 | 10/2019 |

OTHER PUBLICATIONS

Timo Bingmann. 2013. STX B+ Tree C++ Template Classes, http://panthema.net/2007/stx-btree/http://panthema.net/2007/stx-btree/, accessed May 23, 2019, 7 pages.

Robust Performance of Main Memory Data Structures by (Re-)Configuration, SIGMQD'20, Jun. 14-Jun. 19, 2020 Portland, Oregon, 16 pages.

Robert Binna, Eva Zangerle, Martin Pichl, Günther Specht, and Viktor Leis. 2018. HOT: A Height Optimized Trie Index for Main-Memory Database Systems. In Proceedings of the 2018 International Conference on Management of Data—SIGMOD '18. ACM, 521-534. https://doi.org/10.1145/3183713.3196896.

(Continued)

*Primary Examiner* — Gregory A Kessler

(74) *Attorney, Agent, or Firm* — Klarquist Sparkman, LLP

(57) ABSTRACT

Techniques and solutions are described for implementing virtual domains. Computing resources in a computing environment are determined and assigned to one or more virtual domains. One or more data structures can be located in a given virtual domain. The computing resources assigned to a virtual domain can be dynamically reconfigured without affecting processes that submit tasks to be performed on data structures in the virtual domains. Tasks can be submitted to a dispatcher, which can determine the appropriate virtual domain for the task and forward the task to the determined virtual domain. Tasks are received by virtual domains and assigned to worker threads, which can access a data structure specified for a given task.

20 Claims, 19 Drawing Sheets

(56) References Cited

OTHER PUBLICATIONS

Trevor Brown, Alex Kogan, Yossi Lev, and Victor Luchangco. 2016. Investigating the Performance of Hardware Transactions on a MultiSocket Machine. In Proceedings of the 28th ACM Symposium on Parallelism in Algorithms and Architectures. ACM, 121-132. https://doi.org/10.1145/2935764.2935796.

Irina Calciu, Dave Dice, Tim Harris, Maurice Herlihy, Alex Kogan, Virendra Marathe, and Mark Moir. 2013. Message Passing or Shared Memory: Evaluating the Delegation Abstraction for Multicores. In Proceedings of the 17th International Conference on Principles of Distributed Systems—vol. 8304 (OPODIS 2013). Springer-Verlag, 83-97.

Irina Calciu, Siddhartha Sen, Mahesh Balakrishnan, and Marcos K. Aguilera. 2018. How to implement any concurrent data structure. Commun. ACM 61, 12 (2018), 97-105. https://doi.org/10.1145/3282506.

Brian F. Cooper, Adam Silberstein, Erwin Tam, Raghu Ramakrishnan, and Russell Sears. 2010. Benchmarking Cloud Serving Systems with YCSB. In Proceedings of the 1st ACM Symposium on Cloud Computing (SoCC '10). ACM, New York, NY, USA, 143-154. https://doi.org/10.1145/1807128.1807152.

Travis Craig. 1993. Building FIFO and priority queuing spin locks from atomic swap. Report. Technical Report TR 93-02-02, University of Washington,2 9 pages.

Cristian Diaconu, Craig Freedman, Erik Ismert, Per-Ake Larson, Pravin Mittal, Ryan Stonecipher, Nitin Verma, and Mike Zwilling. 2013. Hekaton: SQL Server's Memory-optimized OLTP Engine. In Proceedings of the 2013 ACM SIGMOD International Conference on Management of Data(SIGMOD '13). ACM, 1243-1254. https://doi.org/10.1145/2463676.2463710.

Dave Dice, Virendra J. Marathe, and Nir Shavit. 2011. Flat-combining NUMAlocks. In Proceedings of the twenty-third annual ACMsymposium on Parallelism in algorithms and architectures. ACM, 65-74. https://doi.org/10.1145/1989493.1989502.

David Dice, Virendra J. Marathe, and Nir Shavit. 2015. Lock Cohorting: A General Technique for Designing NUMA Locks. ACM Trans. Parallel Comput. 1, 2 (2015), 1-42. https://doi.org/10.1145/2686884.

Peter Dinda, Thomas Gross, David O'Hallaron, Edward Segall, and Jon Webb. 1994. The CMU task parallel program suite. Report. Carnegiemellon Univ Pittsburgh PA Dept of Computer Science, 11 pages.

Markus Dreseler, Thomas Kissinger, Timo Djürken, Eric Lübke, Matthias Uflacker, Dirk Habich, Hasso Plattner, and Wolfgang Lehner. 2017. Hardware-Accelerated Memory Operations on Large-Scale NUMA Systems . . . In ADMS at VLDB. 34-41.

F. Färber, N. May, W. Lehner, P. GroBe, I. Müller, H. Rauhe, and J. Dees. 2012. The SAP HANA Database—An Architecture Overview. Bulletin of the Technical Committee on Data Engineering / IEEE Computer Society 35, 1 (2012), 28-33.

Goetz Graefe, Arnd Christian König, Harumi Anne Kuno, Volker Markl, and Kai-Uwe Sattler (Eds.). 2010. Robust Query Processing, 19.09.—Sep. 24, 2010. Dagstuhl Seminar Proceedings, vol. 103 81. Schloss Dagstuhl—Leibniz-Zentrum für Informatik, Germany, 64 pages.

A. Herdrich, E. Verplanke, P. Autee, R. Illikkal, C. Gianos, R. Singhal, and R. Iyer. 2016. Cache QoS: From concept to reality in the IntelR XeonR processor E5-2600 v3 product family. In 2016 IEEE International Symposium on High Performance Computer Architecture (HPCA). 657-668. https://doi.org/10.1109/HPCA.2016.7446102.

Index [n. d.]. Index Microbench, https://github.com/speedskater/index-microbench https://github.com/speedskater/index-microbench, accessed: Jul. 9, 2019, 3 pages.

Intel Corporation. 2019. IntelR 64 and IA-32 Architectures Software Developer's Manual Combined vols. 1, 2A, 2B, 2C, 2D, 3A, 3B, 3C, 3D and 4. Report, 5106 pages.

Robert Kallman, Hideaki Kimura, Jonathan Natkins, Andrew Pavlo, Alexander Rasin, Stanley Zdonik, Evan P. C. Jones, Samuel Madden, Michael Stonebraker, Yang Zhang, John Hugg, and Daniel J. Abadi. 2008. H-store: a high-performance, distributed main memory transaction processing system. Proc. VLDB Endow. 1, 2 (2008), 1496-1499. https://doi.org/10.14778/1454159.1454211.

A. Kemper and T. Neumann. 2011. HyPer: A hybrid OLTP & OLAP main memory database system based on virtual memory snapshots. In 2011 IEEE 27th International Conference on Data Engineering. IEEE Press, 195-206. https://doi.org/10.1109/ICDE.2011.5767867.

Thomas Kissinger, Tim Kiefer, Benjamin Schlegel, Dirk Habich, Daniel Molka, and Wolfgang Lehner. 2014. ERIS: A numa-aware in-memory storage engine for analytical workloads. Proceedings of the VLDB Endowment 7, 14 (2014). https://doi.org/10.1.1.475.3378, 12 pages.

Sven O. Krumke and Clemens Thielen. 2013. The generalized assignment problem with minimum quantities. European Journal of Operational Research 228, 1 (2013), 46-55. https://doi.org/10.1016/j.ejor.2013.01.027, 24 pages. https://www.sciencedirect.com/science/article/abs/pii/S037722171300074X.

Justin J. Levandoski, David B. Lomet, and Sudipta Sengupta. 2013. The Bw-Tree: A B-tree for new hardware platforms. In 29th IEEE International Conference on Data Engineering, ICDE 2013, Brisbane, Australia, Apr. 8-12, 2013. 302-313.

Jean-Pierre Lozi, Florian David, Gael Thomas, Julia Lawall, and Gilles Muller. 2012. Remote core locking: migrating critical-section execution to improve the performance of multithreaded applications. In Proceedings of the 2012 USENIX conference on Annual Technical Conference. USENIX Association, 6-6, 12 pages.

Ismail Oukid, Johan Lasperas, Anisoara Nica, Thomas Willhalm, and Wolfgang Lehner. 2016. FPTree: A Hybrid SCM-DRAM Persistent and Concurrent B-Tree for Storage Class Memory. In Proceedings of the 2016 International Conference on Management of Data. ACM, 371-386. https://doi.org/10.1145/2882903.2915251.

Ippokratis Pandis, Ryan Johnson, Nikos Hardavellas, and Anastasia Ailamaki. 2010. Data-oriented transaction execution. Proceedings of the VLDB Endowment 3, 1-2 (2010), 928-939. https://doi.org/10.14778/1920841.1920959.

Danica Porobic, Ippokratis Pandis, Miguel Branco, Pinar Toziin, and Anastasia Ailamaki. 2016. Characterization of the Impact of Hardware Islands on OLTP. The VLDB Journal 25, 5 (2016), 625-650. https://doi.org/10.1007/s00778-015-0413-2.

Jun Rao and Kenneth A. Ross. 1999. Cache Conscious Indexing for Decision-Support in Main Memory. In VLDB'99, Proceedings of 25th International Conference on Very Large Data Bases, Sep. 7-10, 1999, Edinburgh, Scotland, UK. 78-89.

Jun Rao and Kenneth A. Ross. 2000. Making B+-Trees Cache Conscious in Main Memory. In Proceedings of the 2000 ACM SIGMOD International Conference on Management of Data, May 16-18, 2000, Dallas, Texas, USA. 475-486.

James Reinders. 2007. Intel threading building blocks: outfitting C++ for multi-core processor parallelism. O'Reilly Media, Inc., 319 pages.

Kun Ren, Jose M. Faleiro, and Daniel J. Abadi. 2016. Design Principles for Scaling Multi-core OLTP Under High Contention. In Proceedings of the 2016 International Conference on Management of Data. ACM, 1583-1598. https://doi.org/10.1145/2882903.2882958 SIGMQD'20, Jun. 14-Jun. 19, 2020, Portland, Oregon, USA Paper #451.

Sepideh Roghanchi, Jakob Eriksson, and Nilanjana Basu. 2017. Ffwd: Delegation is (Much) Faster Than You Think. In Proceedings of the 26th Symposium on Operating Systems Principles (SOSP '17). ACM, 342-358. https://doi.org/10.1145/3132747.3132771.

Tbb [n. d.]. Threading Building Blocks (TBB). https://www.threadingbuildingblocks.org/ https://www.threadingbuildingblocks.org/, accessed Jul. 25, 2019, 3 pages.

Peter Thoman, Kiril Dichev, Thomas Heller, Roman Iakymchuk, Xavier Aguilar, Khalid Hasanov, Philipp Gschwandtner, Pierre Lemarinier, Stefano Markidis, Herbert Jordan, Thomas Fahringer, Kostas Katrinis, Erwin Laure, and Dimitrios S. Nikolopoulos. 2018. A taxonomy of task-based parallel programming technologies for high-performance computing. The Journal of Supercomputing 74, 4 (2018), 1422-1434. https://doi.org/10.1007/s11227-018-2238-4.

(56) References Cited

OTHER PUBLICATIONS

Ziqi Wang, Andrew Pavlo, Hyeontaek Lim, Viktor Leis, Huanchen Zhang, Michael Kaminsky, and David G. Andersen. 2018. Building a Bw-Tree Takes More Than Just Buzz Words. In Proceedings of the 2018 International Conference on Management of Data—SIGMOD '18. ACM, 473-488. https://doi.org/10.1145/3183713.3196895.

Xiangyao Yu, George Bezerra, Andrew Pavlo, Srinivas Devadas, and Michael Stonebraker. 2014. Staring into the abyss: an evaluation of concurrency control with one thousand cores. Proceedings of the VLDB Endowment 8, 3 (2014), 209-220. https://doi.org/10.14778/2735508.2735511.

European Search Report received in related European Patent Application No. 20197496.1 dated Mar. 15, 2021, 16 pages.

```
1: function DELEGATE_SIMPLE(destination_domain, task_type, parameters)
2:   future = futures[destination_domain];
3:   future.emplace_task(task_type, parameters);  . Directly write task type and parameters into pre-reserved slot in inbox
4:   return future.getResult();  . Possibly wait & get result
```

FIG. 9A

```
1: function DELEGATE_BATCHED(destination_domain, task_type, parameters, slots_per_client, callback)
2:   next_future = pending_futures[destination_domain];  . Get index of next future to use
3:   future = futures[destination_domain][next_future];
4:   future.emplace_task(task_type, parameters);  . Directly write task type and parameters into pre-reserved slot in inbox
5:
6:   next_future++;
7:   if next_future < batch_size then  . Check if batch size is reached
8:     pending_futures[destination_domain] next_future;
9:     return;  . Return empty result
10:  else
11:    for all future : futures[destination_domain] do  . Synchronize all pending futures
12:      result = future.getResult();
13:      callback(result);  . Process result with given callback
14:    pending_futures[destination_domain] = 0;
15:    return results;
```

FIG. 9B

1: function SEND_MESSAGE(payload)
2: resp = allocate_from_area(sizeof(Response)); ← 916
3: slot_index = slot_q.pop(); . Acquire ownership of a slot
4: slot = inbox[slot_index]; . Obtain reference to slot
5: *slot = payload; . Write payload of message
6: slot = slot + sizeof(payload); . Shift pointer to position of resp. reference
7: *slot = resp; . Write reference of response
8: slot = slot + sizeof(resp); . Shift pointer to position of flag
9: mfence(); . Flush prev. writes
10: *slot = 1; . Flip flag to signal availability of message
11: mfence(); . Flush prev. write
12: resp->wait(); . Wait for response with spin lock
13: slot_q.push(slot); . Return ownership of slot
14: return resp->get_result(); . Return value of response

FIG. 9C

1: function RECEIVE_MESSAGES ← 920
2: loop
3: for all slot : inbox do . Scan slots of inbox
4: if slot.is_available() then . Check if message is available
5: message = slot.acquire_message(); . Mark message as acquired and return reference
6: result = do_work(message->get_payload()) . Process payload
7: message->resp->result = result; . Send result
8: mfence();
. Repeat until shutdown

FIG. 9D

```
1: function INITIALIZE(destination_domains, batch_size)                                              ← 924
2: futures = allocate(sizeof(destination_domains) * sizeof(Future) * batch_size);
3:
4: for all domain : destination_domains do ▷ Reserve a slot from each domain to delegate to
5:   for i:=0 to batch_size step 1 do
6:     slot_index = 0;
7:
8:     success, slot_index = slot_q[domain].try_pop(); ▷ Try to acquire ownership of a slot
9:
10:    if not success then
11:      ABORT; ▷ Abort initialization if slot acquisition failed
12:    else
13:      task = inbox[domain][slot_index]; ▷ Obtain a reference the task in the slot
14:      result = allocate_from_domain(local_domain, sizeof(Result));
15:      task.result = result ▷ Write reference of result to task in inbox
16:      mfence(); ▷ Flush write
17:
18:      futures[domain].append( new Future(result, slot_index));
19: return futures;
```

FIG. 9E

```
1: function DEINITIALIZE(futures)                                                                    ← 928
2: for all future : futures do ▷ Futures of all destination domains
3:   future.return_slot(); ▷ Return ownership of slot
4:   free_from_domain(future.result); ▷ Deallocate result from memory
5: free(futures); ▷ Deallocate all futures from local memory
```

FIG. 9F

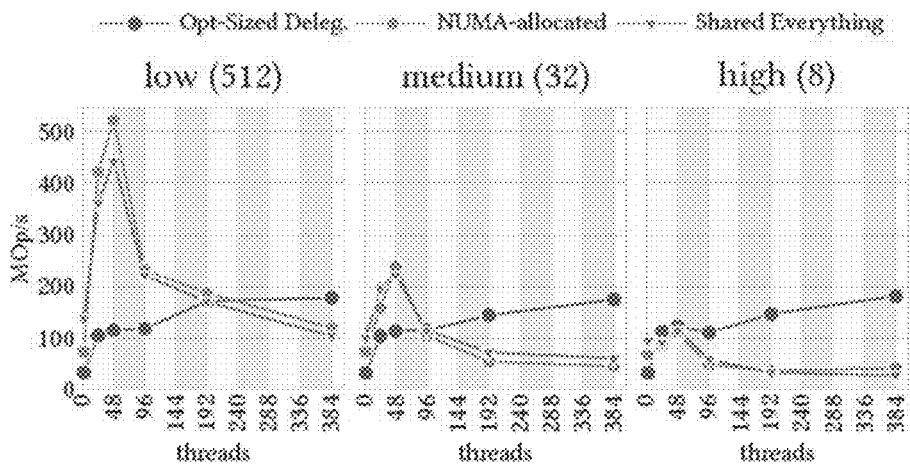
FIG. 10
FIG. 11
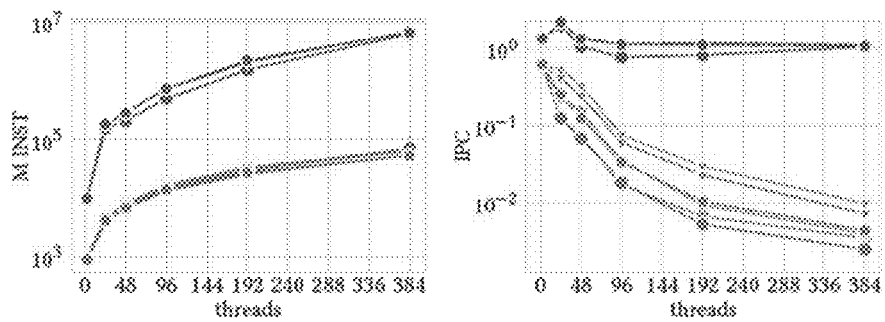
(a) Instructions  (b) Inst. per cycle.
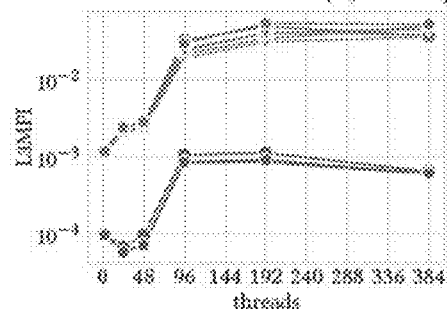
(c) Local L3 misses/inst.
FIG. 12

| Data structure | Synchronization scheme |
|---|---|
| STX B-Tree [6] | no by default, modified: atomic load/store + global lock for inserts |
| FP-Tree [16] | HTM + global lock for fallback |
| Open BW-Tree [22] | Copy-On-Write + atomic CAS |
| Hash Map [2] | Fine-grained locking + spin lock |

| Workload | Read-Only | Read-Update | Read-Insert |
|---|---|---|---|
| B-Tree | ∞ | ∞ | 24 |
| FP-Tree | 96 | 24 | 48 |
| BW-Tree | 96 | 48 | 48 |
| Hash Map | 48 | 24 | 96 |

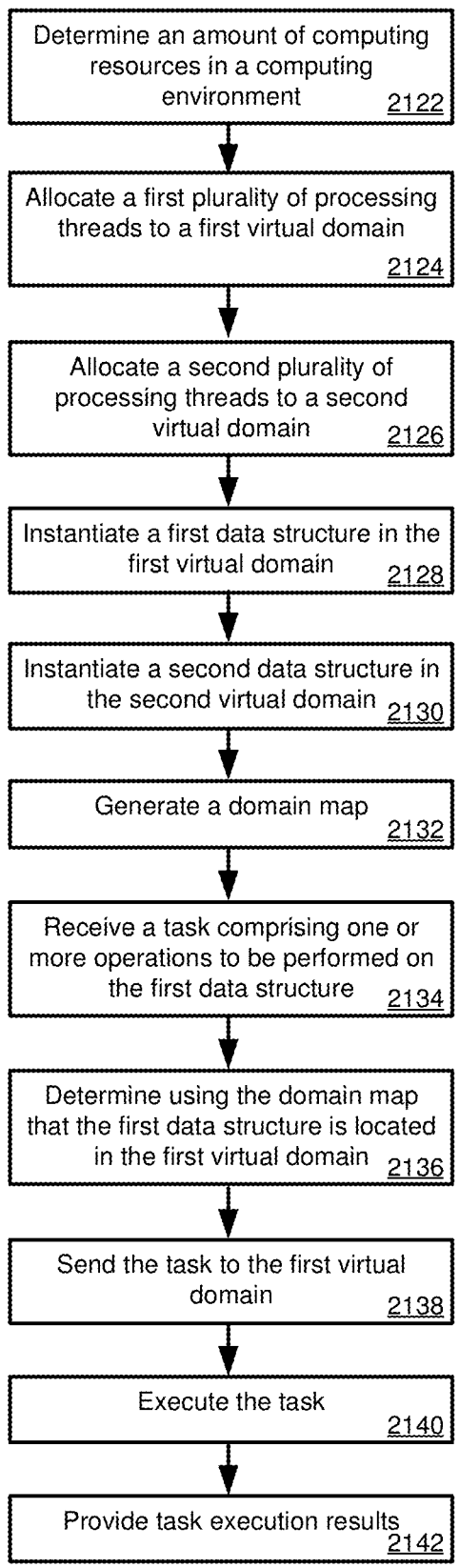
FIG. 21B
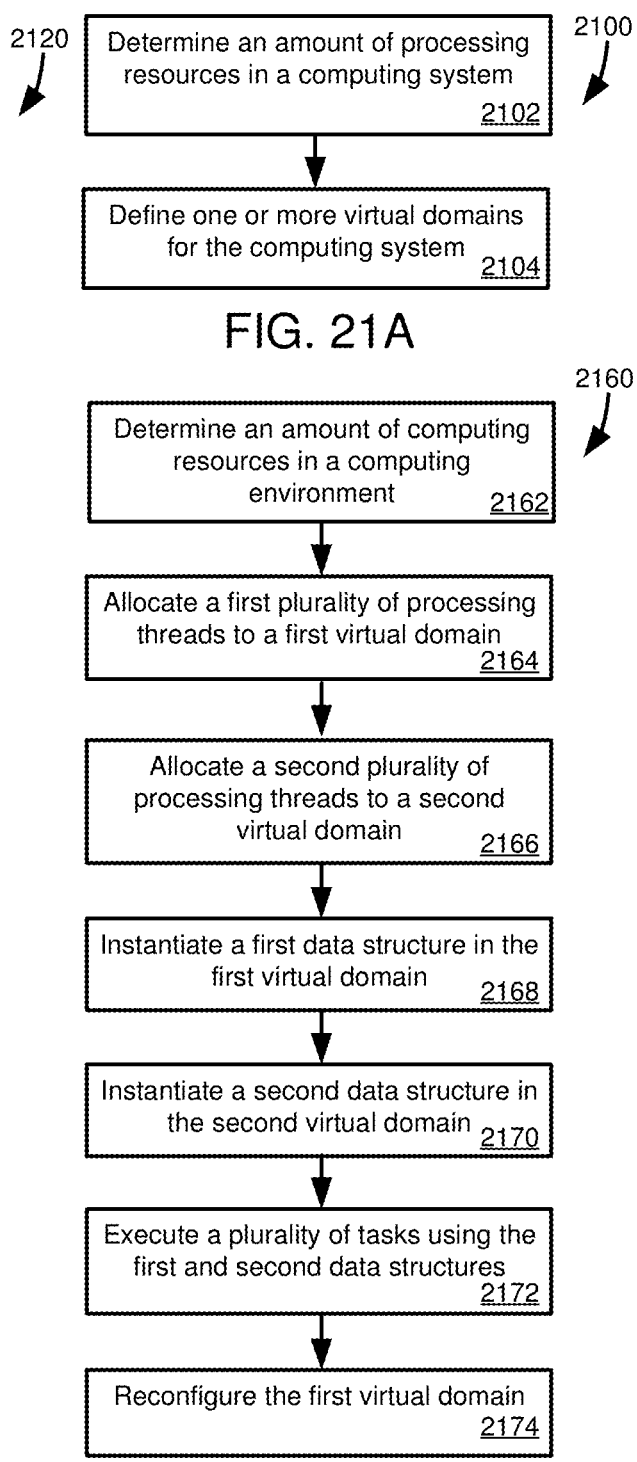
FIG. 21A
FIG. 21C

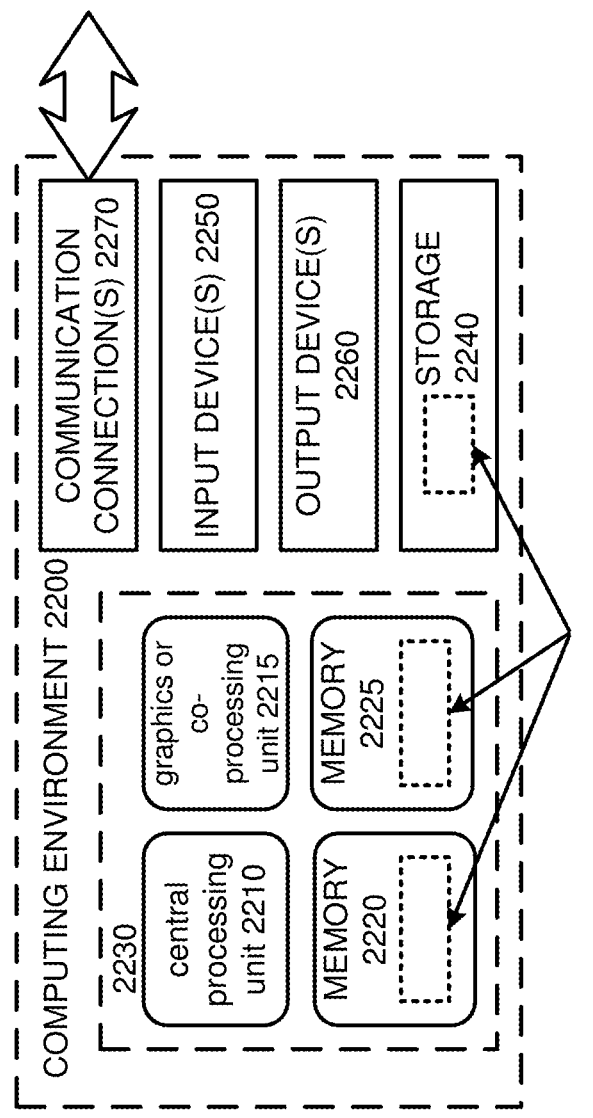

DATA STRUCTURE EXECUTION FRAMEWORK USING VIRTUAL COMPUTING DOMAINS

FIELD

The present disclosure generally relates to managing resources available for task execution in a computing environment. Particular implementations relate to virtual domains, where computing resources can be dynamically assigned to virtual domains.

BACKGROUND

Software applications are often programmed to operate on particular hardware and for workflows having particular characteristics. For example, in a database management system, software that implements an index or a lock manager may have an implementation that defines both how the data structure/component is accessed, as well as how it performs its operations. Configuring a software application can include selecting particular hardware, such as one or more sockets (e.g., a discrete CPU, which may have multiple processing cores and may use techniques such as simultaneous multithreading (SMT) to provide additional virtual cores), on which the application will run. Although a particular software application/hardware combination can be optimized for an expected use, issues can arise if the software is used with other hardware, or if the workload differs from what was anticipated. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for implementing virtual domains. Computing resources in a computing environment are determined and assigned to one or more virtual domains. One or more data structures can be located in a given virtual domain. The computing resources assigned to a virtual domain can be dynamically reconfigured without affecting processes that submit tasks to be performed on data structures in the virtual domains. Tasks can be submitted to a dispatcher, which can determine the appropriate virtual domain for the task and forward the task to the determined virtual domain. Tasks are received by virtual domains and assigned to worker threads, which can access a data structure specified for a given task.

In one aspect, a method is provided for defining one or more virtual domains. An amount of processing resources in a computing system are determined. One or more virtual domains are defined for the computing system. Each virtual domain includes a defined portion of the processing resources and one or more data structure instances. The defined processing resources can be specified as less than all of the processing resources available for a given processing socket of the computing system. The defined processing resources can also be specified as a portion of the processing resources associated with a plurality of sockets of the computing system. Processing resources assigned to a virtual domain are dynamically reconfigurable.

In a further aspect, a method is provided for executing tasks in a computing environment that uses virtual domains. An amount of computing resources in the computing environment is determined. The computing resources include a plurality of processor sockets. Each processor socket includes one or more processing cores. Each processing core includes one or more processing threads.

A first plurality of processing threads of the computing resources are allocated to a first virtual domain. A second plurality of processing threads of the computing resources are allocated to a second virtual domain. A first data structure is instantiated in the first virtual domain, and a second data structure is instantiated in the second virtual domain.

A domain map is generated. The domain map includes identifiers of virtual domains in the computing environment and data structures instantiated in a given virtual domain. The domain map includes an identifier of the first virtual domain and an indicator that the first data structure is located in the first virtual domain. The domain map also includes an identifier of the second virtual domain and an indicator that the second data structure is located in the second virtual domain.

A task is received that includes one or more operations to be performed on the first data structure. It is determined using the domain map that the first data structure is located in the first virtual domain. The task is sent to the first virtual domain. The task is executed using the first data structure. Task execution results resulting from executing the task are provided.

In another aspect, a method is provided for reconfiguring a virtual domain. An amount of computing resources in a computing environment is determined. The computing resources include a plurality of processor sockets. Each processor socket includes one or more processing cores. Each processing core includes one or more processing threads.

A first plurality of processing threads are allocated to a first virtual domain. A second plurality of processing threads are allocated to a second virtual domain. A first data structure is instantiated in the first virtual domain. A second data structure is instantiated in the second virtual domain. A plurality of tasks are executed using the first data structure and the second data structure.

The first virtual domain is reconfigured. The reconfiguring includes changing a number of threads assigned to the first virtual domain or changing at least one thread in the first virtual domain from a processing thread of a first processing core of the one or more processing cores to a processing thread of a second processing core of the one or more processing cores.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 9A-9F provide example pseudocode for implementing various features in a computing environment that provides virtual domains.

FIG. 10 is a table listing read latency for various NUMA distances for a system used to evaluate disclosed technologies.

FIG. 11 provides graphs illustrating throughput for atomic counters under increasing contention for various evaluation scenarios.

FIG. 12 provides graphs illustrating hardware metrics for atomic counters under increasing contention for various evaluation scenarios.

FIGS. 21A-21C are flowcharts illustrating operations in disclosed embodiments for using virtual domains.

FIG. 22 is a diagram of an example computing system in which some described embodiments can be implemented.

DETAILED DESCRIPTION

Example 1—Overview

Figure 1:
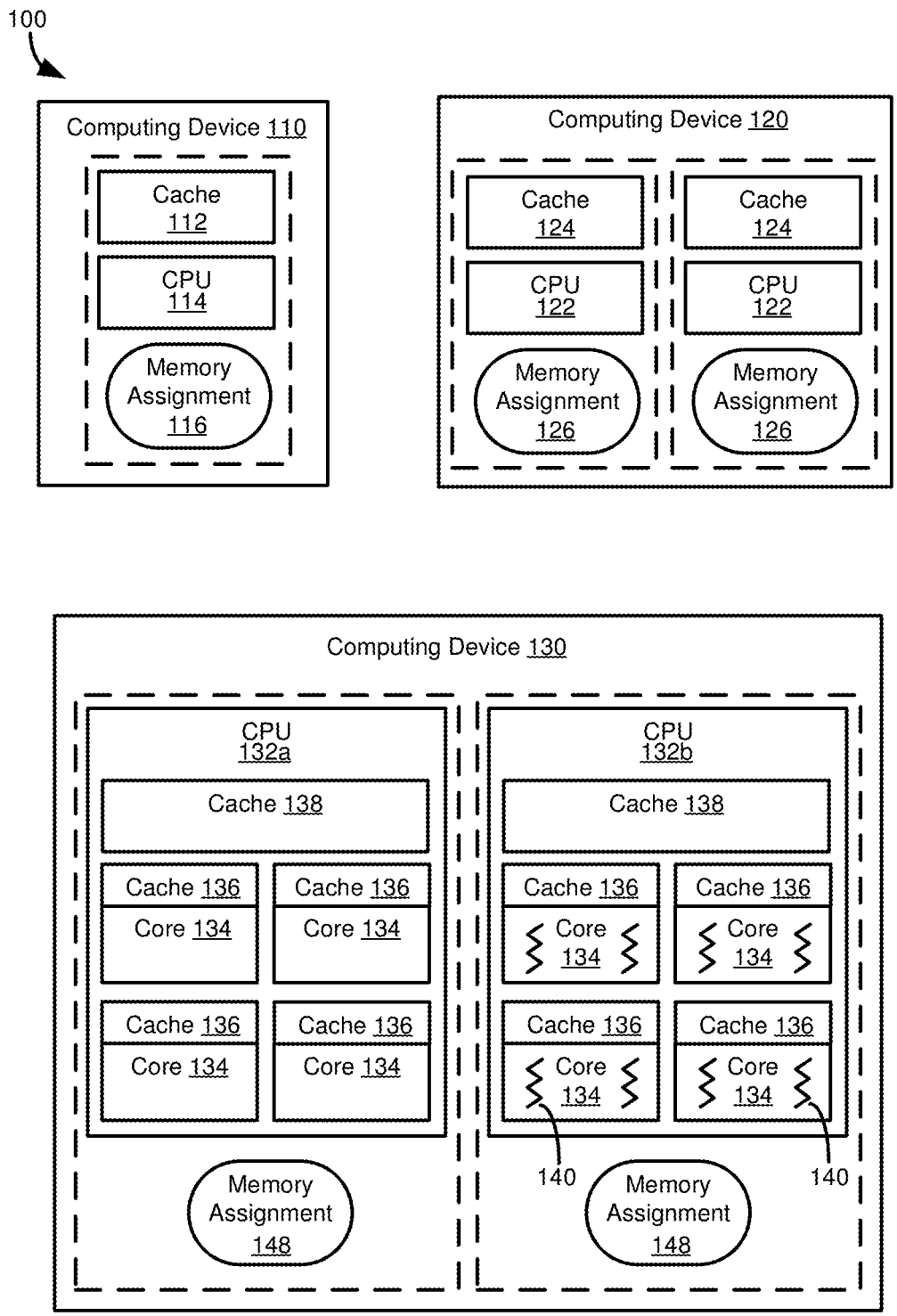
FIG. 1 is a diagram illustrating computing devices having different hardware processing configurations.

Software applications are often programmed to operate on particular hardware and for workflows having particular characteristics. For example, in a database management system, software that implements an index or a lock manager may have an implementation that defines both how the data structure/component is accessed, as well as how it performs its operations. Configuring a software application can include selecting particular hardware, such as one or more sockets (e.g., a discrete CPU, which may have multiple processing cores and may use techniques such as simultaneous multithreading (SMT) to provide additional virtual cores), on which the application will run.

Although a particular software application/hardware combination can be optimized for an expected use, issues can arise if the software is used with other hardware, or if the workload differs from what was anticipated. For example, if a software/hardware configuration is optimized for a workload that is expected to be primarily read operations, issues can arise if the workload changes to be predominantly write-based. If the code for the application, or a particular component of the application, includes functionality for both mediating access to the component and operation of the component, it may be difficult to improve performance without rewriting its code. Even if the code is changed, the software component may not be particularly robust, as another change in hardware or workload may again result in performance issues.

Some attempts have been made to improve software execution when a plurality of computing resources, such as processor sockets, or cores of a particular socket, are available. For example, non-uniform memory access (NUMA)-aware techniques can associate different processor sockets with different memory areas, which can improve computing performance, including by reducing the overhead in maintaining cache coherence between the sockets. However, NUMA-aware techniques are typically limited to particular hardware configuration units (e.g., per-socket), and can be relatively inflexible, in that per-socket workload partition may be suboptimal in some cases, and software may perform suboptimally if coded for a different hardware configuration than is actually present on a given installation (e.g., the hardware and its partitioning, if any, results in contention and skew for a workload being executed). While it has been suggested to partition systems on a per-hardware thread basis, this configuration can also be suboptimal, as being susceptible to skew and the possibility of increased overhead in coordinating work between different partitions for complex workloads. Accordingly, room for improvement exists.

The present disclosure provides for partitioning computing resources into virtual domains. Computing resources can include processing resources at different levels of granularity, including sockets, processing cores on a socket, and computing threads in a SMT processor. One or more data structures can be assigned to a virtual domain. As used herein, data structures can include data structures such as stacks, queues, lists, trees, graphs, and heaps. Data structures can also include more complex or specialized data structures, including those used for carrying out functions of a database management system. Thus, data structures can also include counters (e.g., for assigning timestamps, including commit timestamps), indexes, lock managers, column stores, row stores, logs, transaction tables, record version stores, dependency graphs (e.g., for lock management or transaction processing), and transactions queues. Particular examples of these data structures are those used in the HANA database system of SAP SE, of Walldorf, Germany.

When a virtual domain is configured, in at least some implementations, a number of worker threads can be assigned to the virtual domain. The number of worker threads can be the same as the number of hardware processing threads that are available in a virtual domain. For example, for a virtual domain that includes two processing cores, each capable of operating two computing threads using SMT, the virtual domain can have four worker threads. In other cases, the worker threads can be software threads that can be mapped to hardware threads, where the software worker threads can be managed, such as by an operating system or similar component, or by specifying a number of software worker threads for a given virtual domain.

A virtual domain controls hardware resources that can be used to access a data structure. For example, computing resources assigned to a virtual domain can determine a number of hardware threads available for the virtual domain. A number of worker threads, implemented in software, can be mapped to the hardware threads, where the number of worker threads is typically equal to or greater than the number of hardware threads. The number of software worker threads, including how much larger a pool of software threads is than a pool of hardware threads in a given virtual domain, can be specified in a configuration policy. In some cases, the configuration policy can be dynamically alterable, including reassigning software threads between virtual domain.

Although the configuration of a virtual domain can change, the implementation of the data structure can be independent of the virtual domain. Greater flexibility and efficiency can be provided by separating access to the data structure from the operation of the data structure. For example, if hardware changes, an appropriate virtual domain can be defined for a data structure without having to reprogram the data structure. Similarly, if a workload changes, the virtual domain can be adjusted to provide more or less computing resources without requiring any change to the data structure. An advantage of using virtual domains is that they can be configured, or reconfigured, to provide advantages of other, fixed configurations—such as partitioning resources by socket, by hardware thread, or isolating specific data structures into distinct virtual domains. However, rather than having a fixed configuration, disclosed technologies can provide configurations that use different techniques at different times, various combinations of these techniques, including at different times, as well as providing configurations that are different than these prior techniques, and which can provide advantages in certain scenarios.

When software employing disclosed technologies is deployed, it can be configured for particular workloads, data structures, hardware, etc. Thus, common software can be optimized for a variety of use cases simply by appropriately configuring virtual domains. If circumstances change, the virtual domains can be changed, without requiring changes to the underlying software.

The use of virtual domains can also be beneficial by allowing data structures and/or virtual domains to be changed without impacting applications (or components thereof) that access a particular data structure. For example, an application may submit one or more tasks to a framework that implements a virtual domain service. A task may include one or more operations to be performed using a particular data structure. Tasks can be defined in a way that is independent of the data structure on which a task is executed by a worker thread, and thus data structure implementations can be changed on the fly without affecting application behavior/requiring a change in application code. In some cases, for instance, it may be useful to implement an index as a B-tree, while in other cases a hash table might be more appropriate. The details of the data structure can be abstracted from the software that uses the data structure, allowing the data structure to be dynamically changed.

Typically, performance of a particular data structure improves as the number of threads available to use the data structure increases. However, after a certain point, increasing access to a data structure, such as by increasing the number of threads that can access the data structure, can result in contention for the data structure, and reduce throughput. The disclosed virtual domains can address these issues by providing for both scale-up and scale-out. Scale up allows the number of threads in a given virtual domain to be increased by increasing the computing resources within the virtual domain. When throughput is maximized for the virtual domain, another instance of the data structure can be instantiated, including in another virtual domain, and access to that additional instance of the data structure can be optimized to provide system scale out. For example, in the case of an index, the rows or columns of a table serviced by an index can be partitioned between multiple instances of the index. Each instance of the scaled-out index can be optimized using appropriate scale-up techniques (e.g., setting the number of threads that can access the data structure).

Note that when multiple instances of a data structure exist, their virtual domains need not be identically configured. For example, an index partition that services heavily used data can be hosted in a virtual domain that includes a larger amount of computing resources than a virtual domain that hosts infrequently used data. Similarly, the size of the partitions can be different between two data structures responsible for a particular index.

Example 2—Example Hardware Configurations

FIG. 1 is a block diagram of a computing architecture 100 that illustrates how computing devices can have different hardware configurations. Computing device 110 includes a cache 112, a CPU 114, and a memory assignment 116. The computing device 110 can represent a computing device with a single processor, or with multiple processors that are assigned as a unit. The memory assignment 116 can indicate that all memory (e.g., RAM) is available to the CPU 114. That is, in some cases, a CPU 114 can be connected to memory that is available to additional CPUs, and a memory assignment 116 (e.g., implemented by an operating system or other software, including a framework that manages disclosed technologies with virtual domains). In other cases, a system with multiple CPUs 114 can have different CPUs physically coupled to different memory, such that some memory is physically unavailable to some CPUs. Optionally, when memory access for a CPU 114 is restricted via hardware, additional, software-based restrictions can be applied using a memory assignment 116.

Computing device 120 includes a plurality of CPUs 122. As shown, each CPU 122 has its own cache 124. Each CPU 122 also has its own memory assignment 126. That is, for example, RAM associated with the computing device 120 can be partitioned. Each CPU 122 be assigned a partition using the memory assignment 126. A respective partition can be exclusively accessed by the CPU 122 assigned to the partition by the memory assignment 126, in some cases. In other cases, the memory assignment 126 can designate that particular CPUs 122 have priority for accessing certain memory partitions, but all CPUs can access all memory partitions, at least under certain circumstances. Computing device 120 can represent a NUMA aware design, since different CPUs 122 have different access rights to different memory partitions.

Computing device 130 includes a plurality of CPUs 132 (shown as 132*a*, 132*b*). The CPUs 132 each have multiple processing cores 134. Each processing core 134 typically has its own cache 136 (e.g., L1 or L2 cache) and can access a shared cache 138 for the CPU 132. The processing cores 134 of the CPU 132*b* are shown as each having multiple threads 140 available for computing use (e.g., the CPU 132b is a SMT CPU). Typically, software executing on the computing device 130 will see each thread 140 as an additional processing core. So, if CPU 132a is assumed to be non-SMT, it will have four available cores/processors, while CPU 132b will have eight available cores/processors.

Each CPU 132 is associated with a memory assignment 148. The memory assignments 148 can be implemented at least generally as described for the memory assignments 116, 126, and can provide a NUMA system.

The CPUs 114, 122, 132 can be referred to as sockets (and indicated by dashed rectangles). Typically, resources are made available, including memory in a NUMA system, based on the level of sockets. So, in a database system, for example, one CPU 122 might be designated for executing tasks for a first data structure, and the other CPU 122 might be designated for executing tasks associated with a second data structure.

As will be further described, the present disclosure allows for computing resources, including processors 114, 122, 132, cores 134, and threads 140 to be distributed in a non-uniform, flexible manner in the form of virtual domains. In some cases, a virtual domain can include less than all computing resources in a socket. In other cases, a virtual domain can include resources from multiple sockets. In addition to being flexibly configurable in terms of the computing resources included in a virtual domain, virtual domains can be dynamically adjustable, and domain boundaries can be redrawn to include more or fewer computing resources.

Figure 2:
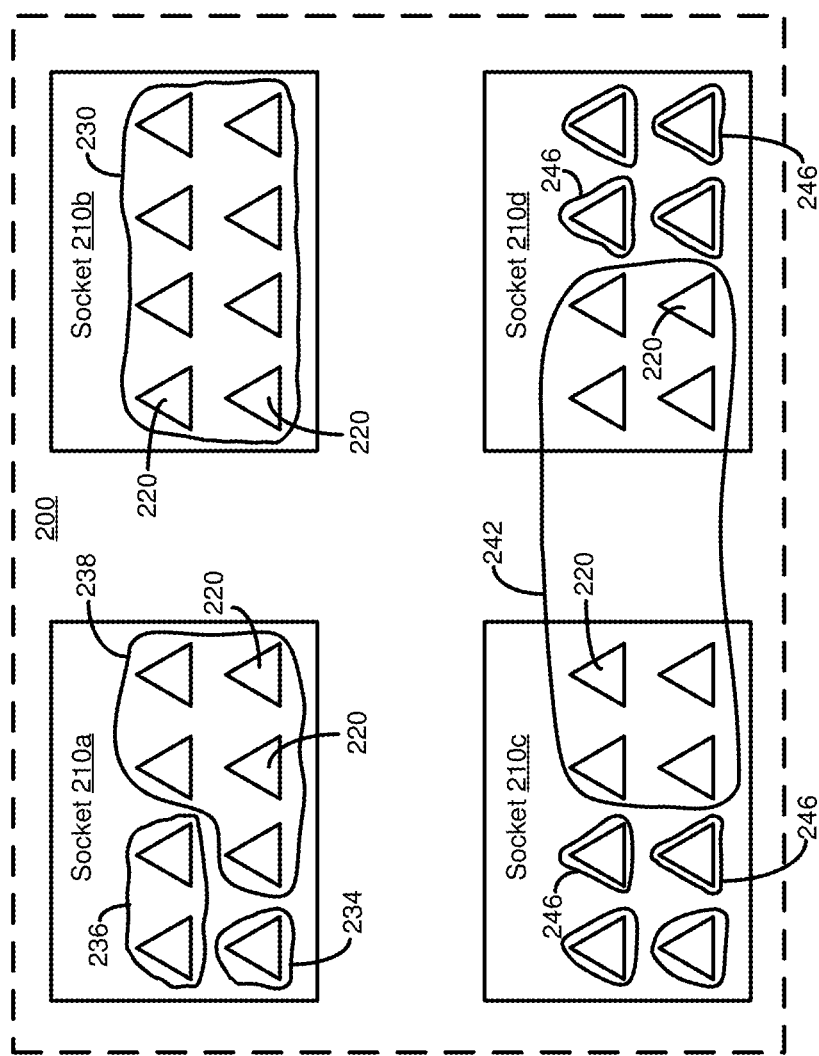
FIG. 2 is a diagram illustrating how virtual domains can be flexibly configured for a given processor socket, or for all or a portion of multiple processor sockets.

Example 3—Example Virtual Domain Definitions with Respect to Computing Resources FIG. 2 illustrates an example architecture 200 that illustrates how virtual domains can be defined to include different amounts of computing resources. FIG. 2 illustrates four sockets 210 (shown as sockets 210a-210d). Each socket includes eight processing cores 220, which can be physical processing cores or threads (e.g. SMT threads) of a processing core. However, it is not necessary for each socket 210 to be configured in the manner shown, and, in general, a socket can be configured as described in Example 1.

In socket 210b, all of the processing cores 220 of the socket are located within a single virtual domain 230. In contrast, the processing cores 220 of the socket 210a are divided into virtual domains 234, 236, 238, with one, two, and five processing cores, respectively. Sockets 210c, 210d are shown as currently being identically configured, with a virtual domain 242 that is made up of four cores 220 of each socket, and where the remaining cores of each socket each form individual virtual domains 246.

Figure 3:
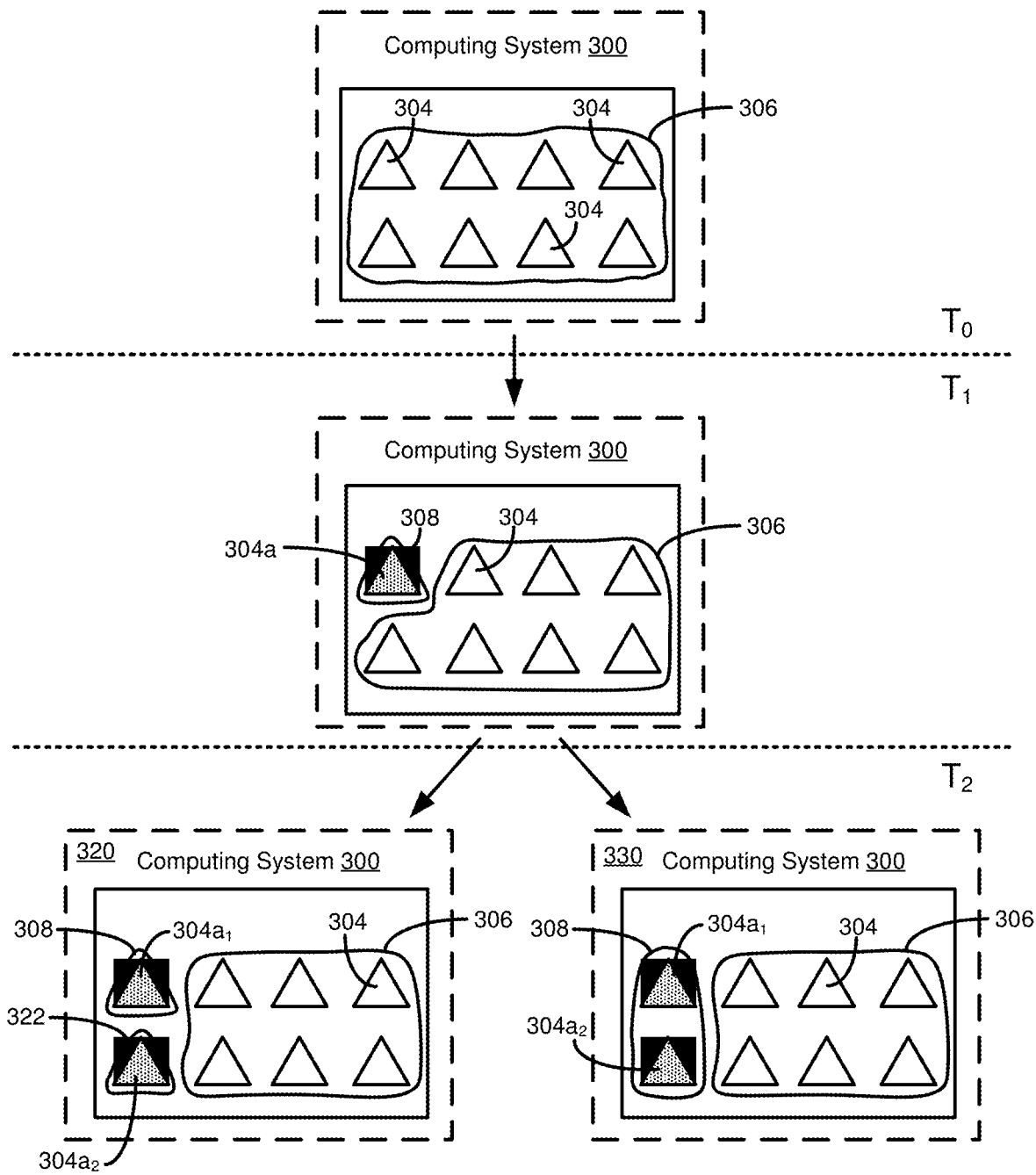
FIG. 3 is a diagram illustrating how virtual domains, and data structure within such virtual domains, can be dynamically reconfigured.

Example 4—Example Virtual Domain Definition and Reconfiguration with Respect to Data Structures FIG. 3 illustrates how virtual domains can be reconfigured based on changes to a computing system, including a change to a workload on the computing system or particular data structures used by the computing system. A computing system 300 includes a plurality of data structures 304. The data structures 304 may be of the same type or of different types. In one implementation, the data structures 304 can be indexes for a database system.

At a time $T_0$, the computing system 300 includes all of the data structures in a single virtual domain 306. Time $T_0$ can represent a time when access requests for each of the data structures 304 are generally equivalent.

At time $T_1$, it may be determined that a particular index 304a is a "hot" index and is receiving a substantially higher number of access requests than the other data structures 304. In this case, the configuration of the computing system 300 can be altered such that the index 304a is included in a virtual domain 308, while the other data structures 304 can remain in the virtual domain 306. The computing system 300 at time $T_1$ can represent a scale-up scenario with respect to the index 304a, as the virtual domain 308 can have a larger number of threads available to service the index 304a or, at the least, the threads can be dedicated to servicing the index 304a rather than the index 304a and the other data structures 304.

At time $T_2$, it may be determined that resources allocated to servicing requests for the index 304a may be insufficient. It may also be determined that providing additional computing resources to the virtual domain 308 may be a sub-optimal way to increase performance. It may be determined, for example, that assigning additional worker threads to the virtual domain 308 may result in contention for the single instance of the index 304a such that performance may even be negatively impacted by adding additional threads.

FIG. 3 illustrates two possible scenarios for configuring the computing system at time $T_2$. In scenario 320, a second instance of the index 304a has been created to provide index $304a_1$ and index $304a_2$. Each index $304a_1$, $304a_2$ can be responsible for a different partition of data serviced by the index 304a. Each index $304a_1$, $304a_2$ is shown as being assigned to its own individual virtual domain, with index $304a_1$ being in virtual domain 308 and index $304a_2$ being in virtual domain 322. The virtual domains 308, 322 can have the same amount of computing resources or can have different amounts of computing resources. Scenario 320 can represent a scale-out scenario.

Time $T_2$ can instead be associated with scenario 330, which represents another scale-out scenario. Scenario 330 also includes index instances $304a_1$, $304a_2$. However, in scenario 330, both index instances $304a_1$, $304a_2$ are located in the virtual domain 308. The virtual domain 308 can include the same amount of computing resources as at time $T_1$, or can be modified to include additional computing resources. As the number of instances of index 304a has increased in scenario 330, additional computing resources can be added to the virtual domain 308 without negatively impacting performance.

Figure 4A:
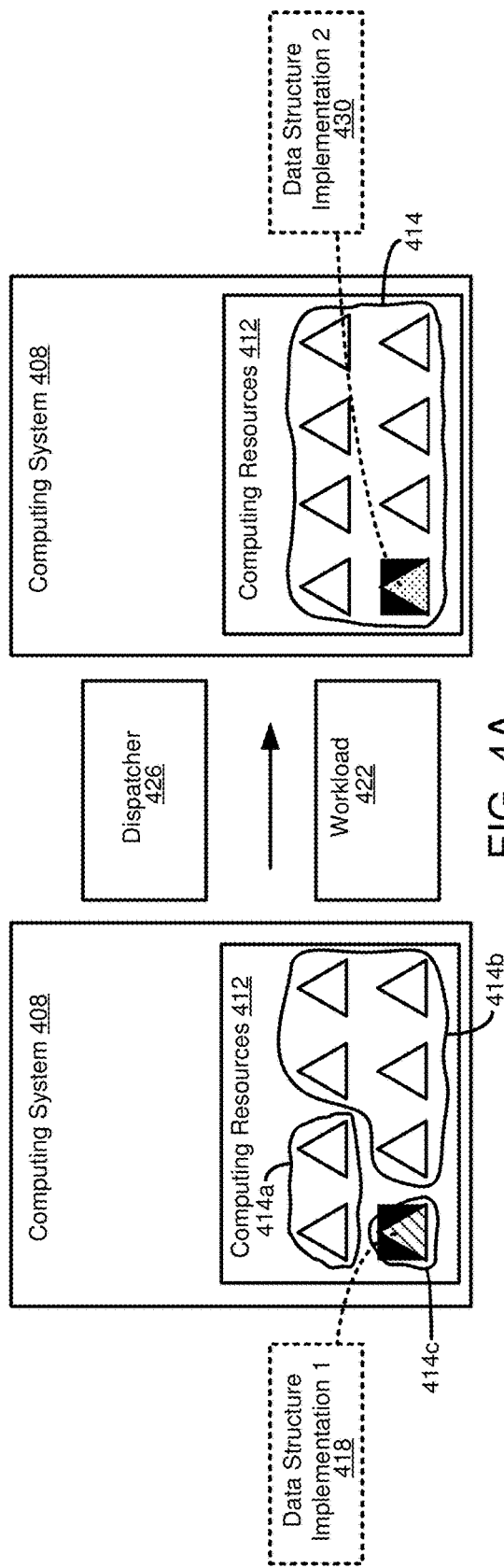
FIG. 4A is a diagram illustrating how virtual domains can facilitate dynamically changing implementations for a data structure without disruption to a workload.
Figure 4B:
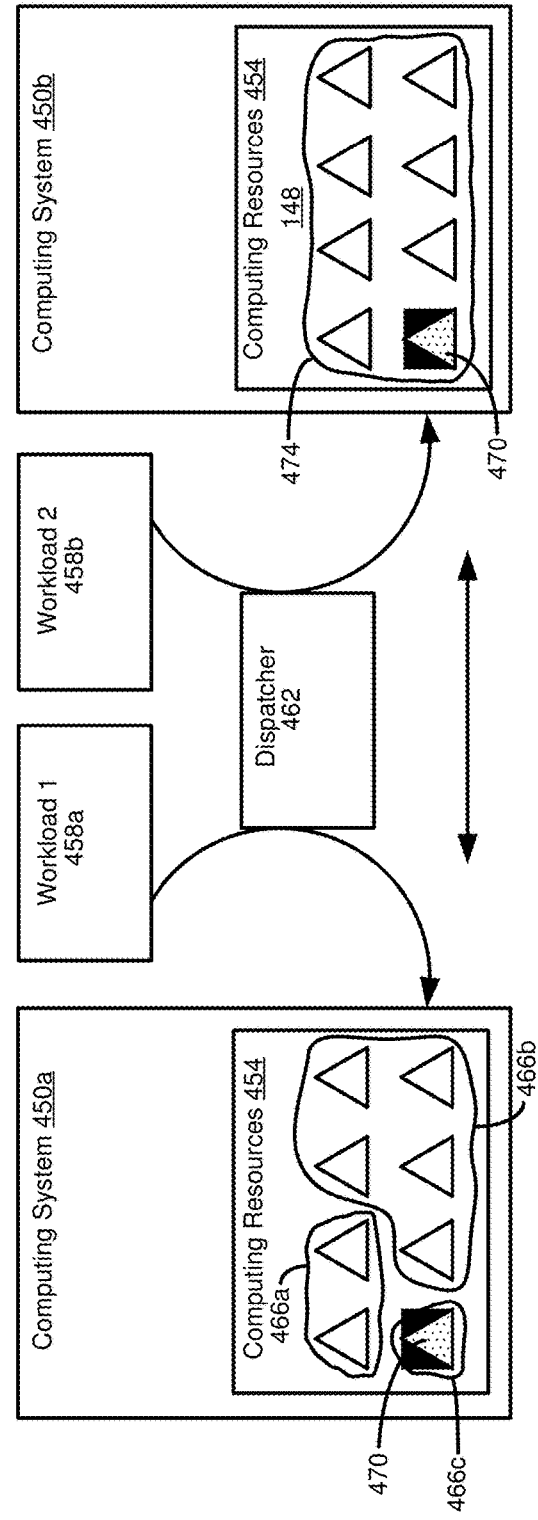
FIG. 4B is a diagram illustrating how virtual domains can be reconfigured based on changes to a workload.

Example 5—Example Exchange of Data Structure Implementation and Virtual Domain Definition Upon Workload Change As discussed above, advantages of virtual domains include flexibility, as they can be dynamically changed, and that changes to a virtual domain or data structures within a virtual domain can be abstracted from applications that use data structures within virtual domains. FIG. 4A illustrates how data structure implementations used in a virtual domain may change, and may (or may not) be accompanied by changes in the definition of a virtual domain. FIG. 4B illustrates how virtual domains may be altered when a workload for the virtual domain changes.

FIG. 4A illustrates a computing system 408 that includes computing resources 412 partitioned into three virtual domains 414 (shown as virtual domains 414a-414c). A first data structure implementation 418 is allocated to virtual domain 414c. The first data structure implementation 418 is for a specific type or class of data structure, such as an index, counter, or lock manager. The computing system 408 is associated with a particular workload 422, including a particular workload that accesses the first data structure implementation 418.

A dispatcher 426 receives tasks from the workload 422 and delegates the tasks to the appropriate data structure, including delegating the tasks to the appropriate virtual domain 414 for a data structure that is to perform the task. For example, if the workload 422 includes a task for a data structure implemented by the first data structure implementation 418, the dispatcher 426 delegates the task to the virtual domain 414c to be performed by the first data structure implementation.

At some point, it may be desired to change the implementation of the first data structure from the first data structure implementation 418 to a second data structure implementation 430. As an example, the first data structure implementation 418 can be a B-tree implementation of an index and the second data structure implementation 430 can be a hash table implementation of an index. Or, both the first and second data structure implementations 418, 430 can be of the same class and type, such as being B-tree indexes, but implementation details can differ between the data structure implementations. Implementations may be changed for various reasons, including based on changes to the workload 422 (e.g., the nature of the requests might suggest a change from a B-tree index to a hash table index), based on the development of more efficient data structure implementations, or for other reasons.

Disclosed technologies, including the dispatcher 426, can abstract details of the data structure from tasks of the workload 422. The dispatcher 426 can provide, or can provide functionality equivalent to, an API. A task of the workload 422, for example, can specify an index lookup request using an API method. Because the details of accessing and using the data structure are abstracted from the workload 422, the data structure can be changed between the implementations 418, 430 without components that issue tasks as part of the workload having to be re-coded or modified.

An API, in some examples, can accept tasks, generally, without regard to the nature (e.g., implementation) of the task or the data structure on which the task is to be performed. Similarly, in some cases a single task implementation may be used to perform tasks on multiple data structures. The API can thus be used to transfer tasks, and, in some implementations, task results, without evaluating the task, or message, included in a task request or response. The contents of the task can, for example, be evaluated and executed by a worker thread on a data structure targeted by the task.

In some cases, the data structure implementation can be changed from 418 to 430 without changing the configuration of the virtual domains 414. However, in some cases the virtual domains 414 can be reconfigured, including to account for differences in the operation of the data structure implementations 418, 430. As shown, in the computing system 408 with the second data structure implementation 430, the virtual domains 414a-414c have been reconfigured into a single virtual domain 414.

Note that FIG. 4A has features shown to highlight particular aspects of the disclosed technologies. It should be appreciated that other aspects of the disclosed technologies can be incorporated into FIG. 4A even though they are not illustrated. For example, while a single data structure is shown in the computing system 408, one or more of the virtual domains can have more than one data structure, and a data structure can have more than one instance.

FIG. 4B illustrates a computing system 450 (shown as computing systems 450a, 450b) that includes computing resources 454. The computing system 450a is associated with a first workload 458a and the computing system 450b is associated with a second workload 458b. A dispatcher 462 dispatches tasks from the workload 458a or the second workload 458b to the computing system 450a or the computing system 450b, respectively.

The computing system 450a has its computing resources 454 allocated to a plurality of virtual domains 466 (shown as virtual domains 466a-466c). A data structure implementation 470 is assigned to the virtual domain 466c. In contrast, the computing system 450b has its computing resources 454 allocated to a single virtual domain 474.

The computing system 450a can represent a configuration of virtual domains 466 that is tailored to the first workload 458a. For example, the first workload 458a can have a larger number of requests for the data structure implementation 466 than the second workload 458b. The virtual domain 466c can represent a virtual domain that is dedicated to the data structure implementation 470.

The computing system 450b can represent a virtual domain configuration, the single virtual domain 474, that is tailored to the second workload 458b. For example, the second workload 458b can have a smaller number of requests for the data structure implementation 470 than the first workload 458a. The virtual domain 474 can represent a virtual domain that is not dedicated to the data structure implementation 466, but rather includes a plurality of data structures.

The computing system 450 can be changed between the configurations 450a, 450b depending on the workload characteristics being submitted to the computing system. That is, a threshold can be set that determines that the workload has the characteristics of the first workload 458a. If the characteristics of the workload change to meet criteria defined for the second workload 458b, the computing system can be changed from the configuration 450a to the configuration 450b. Similarly, if the computing system 450 is in the configuration 450b, and it is determined that the workload characteristics change from those defined for workload 458b to those defined for workload 458a, the computing system can be changed from the configuration 450b to the configuration 450a.

In some cases, the performance of the computing system 450 can be automatically monitored. If it is determined that performance metrics, including based on workload changes, indicate that virtual domains should be reconfigured, the virtual domains can be automatically reconfigured. For example, reconfiguration can involve expanding a virtual domain to include additional computing resources (e.g., scale up) or reducing computing resources in a virtual domain if it is determined that the data structures in the virtual domain are over-resourced (i.e., underutilized as compared with their assigned resources). Similarly, the number and types of data structures in a virtual domain can be adjusted—such as adding data structures to an over-resourced virtual domain (e.g., to reduce contention on any single data structure in the virtual domain) or removing data structures from an under-resourced virtual domain (which removed data structures can be placed in a new virtual domain or added to another existing virtual domain).

Reconfiguring a computing system can also include creating additional instances of a particular data structure, or changing an implementation type for a particular data structure (e.g., as described with respect to FIG. 4A). In some cases, different types of data structures can have different performance characteristics, and those characteristics can be used to help determine the configuration of virtual domains, including whether the data structure should be placed in its own virtual domain or can be placed in a shared virtual domain with other data structures. Data structure characteristics can also be used to determine what mix of data structures should be included in a shared virtual domain, including determining that multiple homogenous data structure classes should be included in a virtual domain rather than a heterogenous mix of data structure classes.

In other cases, virtual domains can be manually reconfigured. For example, a user can monitor performance of a computing system and adjust the virtual domains (including data structures or particular data structure implementations) as desired, including as shown in FIGS. 4A and 4B.

Example 6—Example Dispatching of Tasks to Virtual Domains

An advantage of disclosed technologies is that they can separate the operations performed by data structures from methods used to access the data structures. Thus, for example, when hardware or workload characteristics change, the access methods can be changed to accommodate the hardware or workload changes without requiring a change in the data structure implementation. Similarly, the implementation of operations accessing the data structure can remain unchanged, even though the configuration of the virtual domain associated with the data structure may change. Or, if the data structure implementation is changed, that can also be abstracted from clients submitting tasks to be performed on the data structure.

Figure 5:
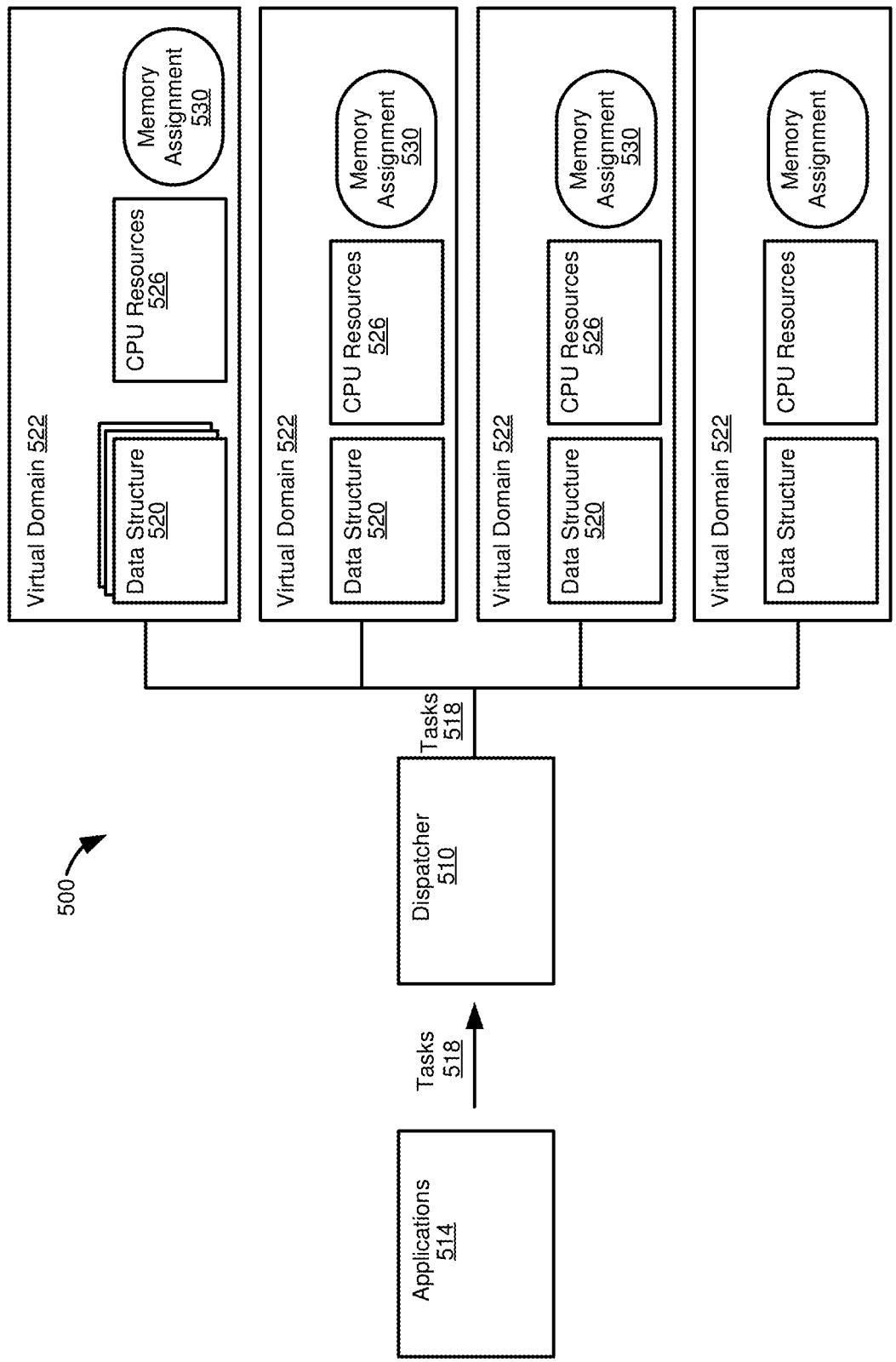
FIG. 5 is a diagram illustrating how a dispatcher can delegate tasks to virtual domains, where a virtual domain can include one or more data structures on which delegated tasks are executed.

FIG. 5 illustrates an architecture 500 that includes a dispatcher 510 that provides access methods that allow applications 514 (or application processes, which can be part of the same application that implements the dispatcher or other components of the architecture) to submit tasks 518 to be performed by on data structures 520 located in a plurality of virtual domains 522 by worker threads assigned to the respective virtual domains.

As shown, each virtual domain 522 includes CPU resources 526, which can be implemented as described in the present disclosure. In particular, each virtual domain 522 can include the same or different amounts of CPU resources 526, which can be located on one or more sockets, and which can consist of entire sockets or sub-portions of sockets (e.g. individual processing cores or execution threads in a SMT architecture).

The virtual domains 522 are also shown as having memory assignments 530. The memory assignments 530 represent particular memory that is reserved for a given virtual domain 522, or for which the virtual domain has prioritized access. Thus, the memory assignments 530 can allow the architecture 500 to implement a NUMA configuration. In some cases, the memory assignments 530 can be correlated with particular data structures 520 located in the virtual domain. For example, a virtual domain 522 that includes a data structure 520 that implements a counter can include an indication in the memory assignment 530 of memory that is to be used by the counter (e.g., program code that implements the counter, including data provided to the counter or returned by the counter).

As shown, some virtual domains 522 include a single data structure 520, while other virtual domains include a plurality of data structures. As has been described, virtual domains 522 can be dynamic, such that data structures 520 in the virtual domain, CPU resources 526 assigned to the virtual domain, and memory assignments 530 can be altered on the fly, including without having to modify code for the data structures or altering code or behavior of the applications 514 or tasks 518.

The dispatcher 510 can be responsible for distributing tasks 518 to the appropriate virtual domain 522. That is, at least in particular implementations, applications 514 do not submit tasks 518 directly to virtual domains 522 or data structures 520 within virtual domains. Rather, the dispatcher 510 receives a task 518 from an application 514 and determines which virtual domain 522 should receive the task. In some cases, the task 518 can specify a virtual domain 522 to receive the task, while in other cases the applications 514 are not aware of virtual domains. In such cases, the task 518 can specify a data structure 520, and the dispatcher 510 can determine which virtual domain 522 includes the referenced data structure. If the data structure 520 has multiple instances, the dispatcher 510 can also determine which virtual domain 522 has the appropriate data structure instance. Or, a task 518 can specify a task type, and the dispatcher 510 can determine which data structure 520 is appropriate to perform the task, and can send the task to the virtual domain 522 that hosts that data structure or data structure instance. For example, a task can be "index lookup," and the dispatcher 510 can determine the appropriate data structure 520 and virtual domain 522. In some cases, the dispatcher 510 can send a single task 518 to a plurality of virtual domains 522 (e.g., in a multicast or broadcast manner), including when the task is to be performed on multiple instances of a given data structure 520, where at least some of the instances are located in different virtual domains.

Although the applications 514 do not communicate directly with virtual domains 522 or data structures 520 in this Example 6 when submitting tasks, in at least some implementations the clients can subsequently communicate with virtual domains or data structures, as will be further described. Briefly, when a task 518 is assigned to a virtual domain 522, the application 514 can be provided with a handle that can be used to access task information at a virtual domain. For example, the application 514 may use the handle to cancel the task 518, obtain a status of the task, or to obtain task results.

Although in this Example 6 applications 514 do not directly send tasks 518 to virtual domains 522 or data structures 520, in other embodiments the clients can directly access a virtual domain or data structure. In particular, in some cases an application 514 submits tasks 518 to particular data structures 520, but the configuration of the virtual domains 522 can still be abstracted from the applications, allowing the virtual domains to be dynamically configured (and reconfigured).

Example 7—Example Virtual Domain Structure

Figure 6:
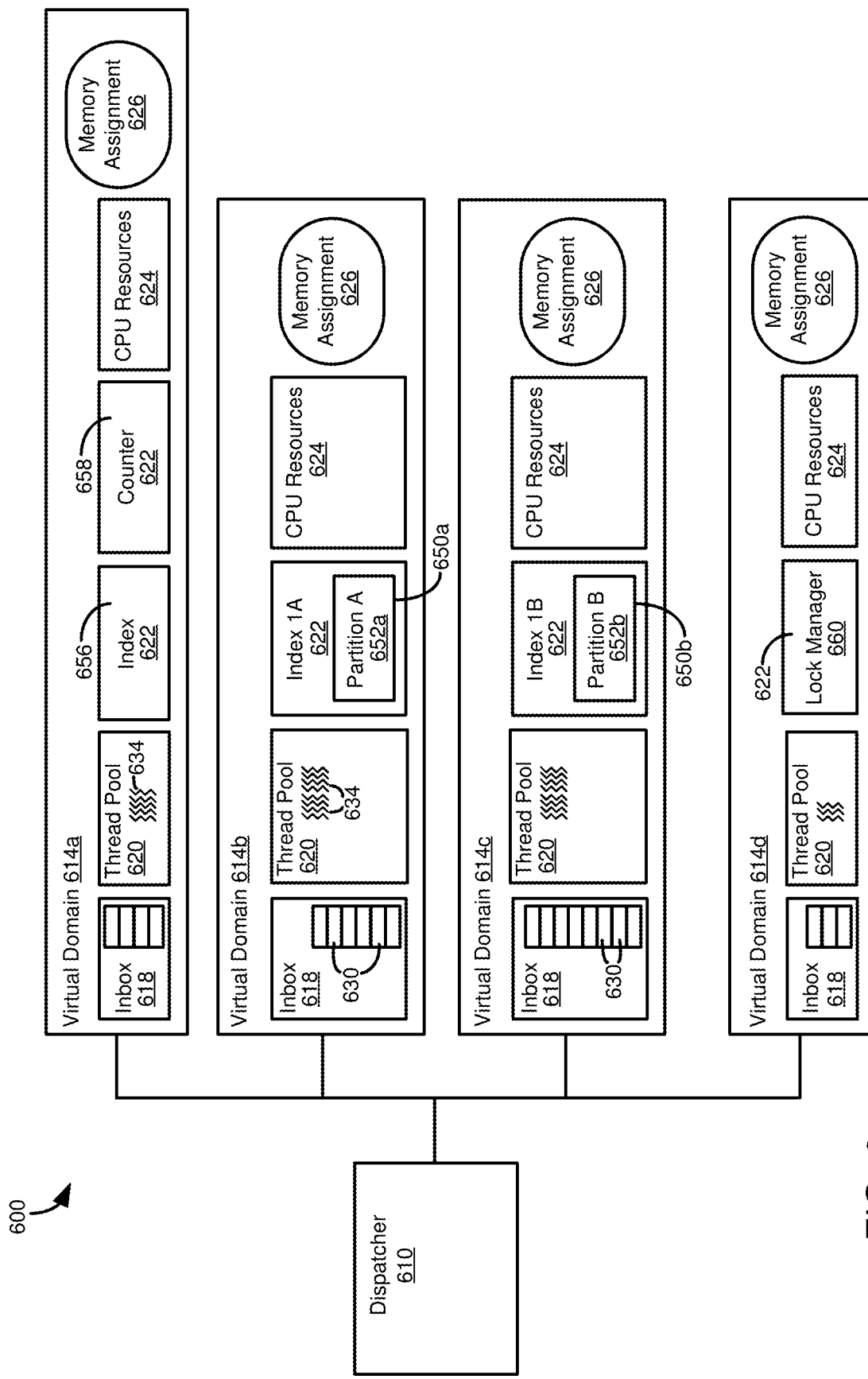
FIG. 6 is a diagram illustrating components of virtual domains.

FIG. 6 provides a more detailed architecture 600 in which disclosed technologies can be implemented. The architecture 600 is generally similar to the architecture 500, including a dispatcher 610 and a plurality of virtual domains 614 (shown as virtual domains 614a-614c). The applications 514 and tasks 518 of FIG. 5 are not shown in FIG. 6 for clarity of presentation.

Each virtual domain 614 includes an inbox 618, a thread pool 620, one or more data structures 622, computing resources, shown as CPU resources 624 (but which could include other computing resources, such as memory, network resources, physical storage resources, etc.), and a memory assignment 626 (which can be implemented as described for the memory assignments 530 of FIG. 5, described in Example 6).

Each inbox 618 includes one or more, and typically a plurality, of slots 630. When a task is received by a virtual domain 614, it is assigned to a slot 630 of the inbox 618. In some cases, the slots 630 can be managed as a data structure, such as a stack, a queue, or a list. In an example embodiment, slots 630 are managed such that only a single client uses a slot at given time, for executing one or more specified tasks, and then the slot can be released, where it then can be assigned to different clients (or in response to a different request by the previous client). Slots 630 can be associated with identifiers that can be returned to clients and used to manage a task, including checking a task status, cancelling a task, or retrieving task results. As shown, in at least some implementations, the number of slots 630 in a virtual domain's inbox 618 can be specifically configured for a virtual domain 614. In other cases, each virtual domain 614 can have the same number of slots 630 in their inboxes 618, but the number of slots can be configured for a particular implementation of the architecture 600.

In further cases, a slot 630 can include one or both of a pointer to task data or a pointer to task results. For example, a worker thread can obtain a pointer for a task from a slot 630, obtain task data from the corresponding memory location, execute the task, and place task results in the memory location pointed to by the slot (e.g., a results buffer). An application can then retrieve data from the memory location pointed to by the results pointer in the slot.

In some cases, if a task is received by the dispatcher 610 and a slot 630 is not available in the inbox 618 of the relevant virtual domain 614, the task can be queued, at least for a period of time, at the dispatcher 610 (or at a queue or other data structure of the virtual domain). In other cases, if the inbox 618 is full, the task can be rejected, which can include notifying the relevant application/process that the task could not be performed. Or, the application can wait until a task can be submitted to the virtual domain 614, such as if a slot 630 (or a sufficient number of slots, if the application has requested batched tasks) becomes available.

Tasks in the inbox 618 can be serviced by threads 634 (e.g., worker threads) in the thread pool 620. Typically, each task occupies a single slot 630 and is serviced by a single thread 634. The number of threads 634 in the thread pool 620 can be greater, larger, or smaller than the number of slots 630 in the inbox 618 of a given virtual domain 614. However, to avoid thread contention, typically the number of threads 634 is at least as large as the number of slots 630 of the inbox 618. In at least some implementations, the number of threads 634 in the thread pool 620 is configurable, including configuring different numbers of threads for the thread pools of different virtual domains 614. However, each virtual domain 614 typically is assigned at least one thread 634.

Depending on the implementation, the threads 634 in the thread pool 620 can correspond to computing threads of the CPU resources 624. That is, for example, if the CPU resources 624 for a particular virtual domain consist of 8 threads (e.g., four processing cores, each with two threads available via SMT), eight threads 634 may be available in the corresponding thread pool 620. In other cases, multiple software threads 634 can be mapped to computing threads (i.e., hardware threads) of the CPU resources 624. The number of threads 634 (worker threads) is typically the same as, or greater than, the number of computing threads provided by the CPU resources 624.

The architecture 600 also illustrates how different virtual domains 614 may have different numbers or types of data structures 622, and that data structures can have multiple instances, including instances located in different virtual domains. For example, virtual domains 614b, 614c each have a single data structure 622, in this case different instances 650a, 650b (associated with different data partitions 652a, 652b), of an index. Virtual domain 614a includes two data structures 622, shown as an index 656 and a counter 658. Virtual domain 614d includes a lock manager 660 as the single data structure 622 in the virtual domain.

As described above, the nature of a data structure 622 can, at least in part, determine other properties, or a range of properties for a virtual domain 614. For example, the nature of the data structure 622 can determine whether the virtual domain 614 can include additional data structures, or the type of additional data structures that can be included. The nature of the data structure 622 can also be used, at least in part, to determine the number of slots 630 in the inbox 618, the size of the thread pool 620, or the quantity of CPU resources 624 assigned to the virtual domain 614.

Example 8—Example Scenario for Task Processing Using Virtual Domains

Figure 7:
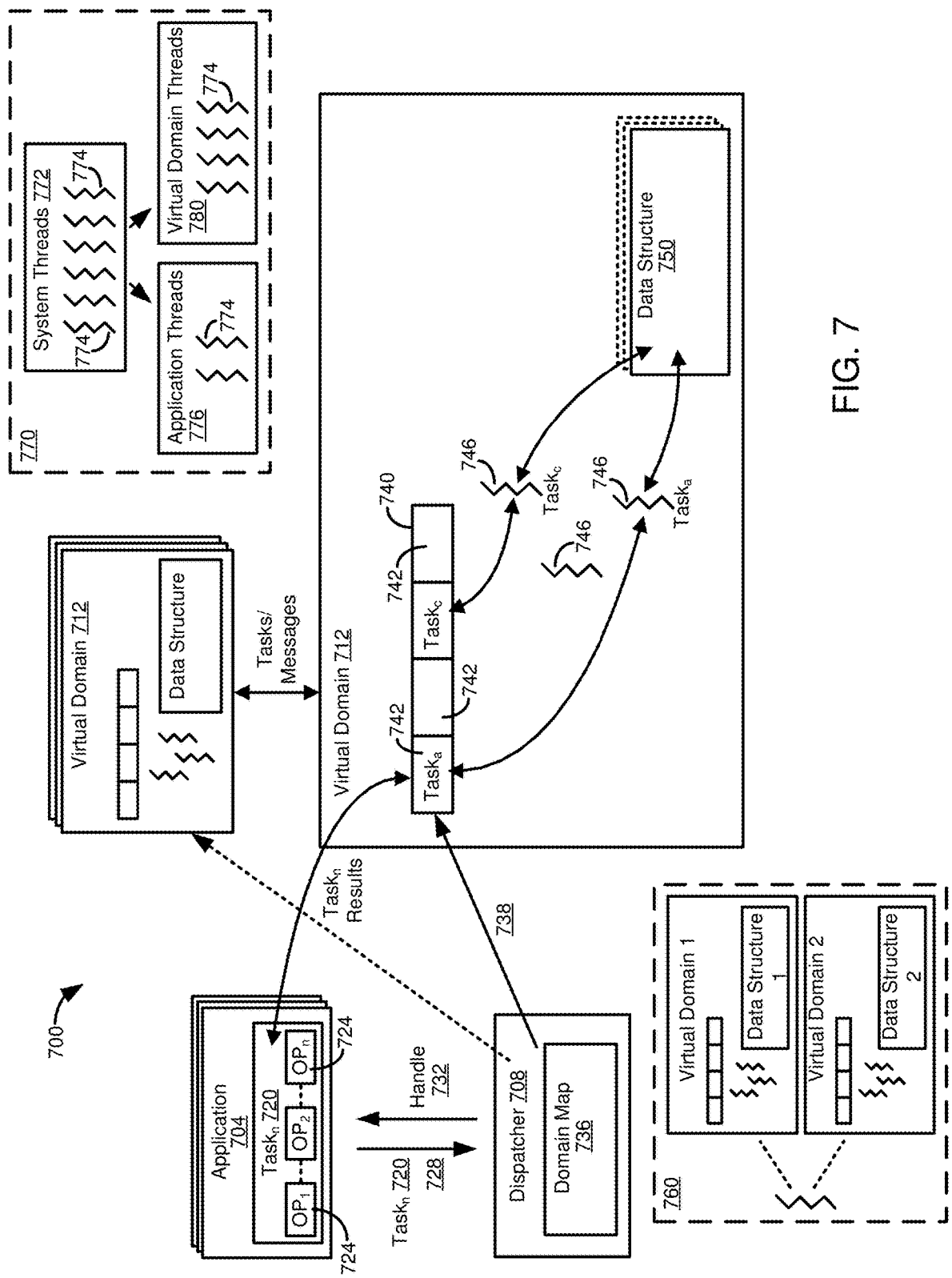
FIG. 7 is a diagram illustrating a scenario for executing application tasks using virtual domains.

FIG. 7 is a schematic diagram illustrating a scenario 700 for executing tasks using virtual domains, according to an embodiment of the present disclosure. The scenario 700 is carried out using one or more applications (or components or processes thereof) 704, a dispatcher 708, and one or more virtual domains 712. The virtual domains 712 can be configured as described in Examples 1-7, including being assigned various computing resources, including CPU resources, and optionally associated with memory assignments.

An application 704 can generate tasks 720, which can include one or more operations 724. Typically, each task 720 is independent of other tasks, and each operation 724 in the task is to be performed on the same data structure instance and in the same virtual domain. In other implementations, a task 720 can have operations 724 that are to be executed by different data structure instances, as long as each data structure instance is in the same virtual domain 712.

In the scenario 700, multiple applications 704 can concurrently issue tasks 720 to the dispatcher 708, which tasks can be directed to the same virtual domain 712 and/or data structure instance in a given virtual domain, or can be to different virtual domains and/or data structure instances.

A particular application 704 can also concurrently issue multiple tasks 720 to the dispatcher 708, which can be referred to as "bursting" or "batching." These multiple tasks 720 can be directed to the same virtual domain 712 and/or data structure instance in a given virtual domain, or can be to different virtual domains and/or data structure instances. As, at least in some implementations, tasks 720 are configured to be independent of other tasks, at least with respect to their execution in a virtual domain 712, when an application 704 issues multiple tasks, the application is responsible for managing results received from the tasks, including respecting application-level dependencies between tasks.

If a client intends to issue multiple tasks as a batch or burst, the client can inform the dispatcher of the burst request. The client can specify a burst size (optionally up to a maximum allowed size, which is typically less than or equal to a size of an inbox 740 of a virtual domain 712). In response to the burst request, the dispatcher 708 can preallocate inbox slots 742 for the request. In some implementations, the dispatcher 708 can also preallocate results buffer space to receive execution results for tasks in the burst request. Tasks in the burst can be independently delegated by the application 704, which only needs to process request results from the bursted tasks when the slots allocated for the burst are full. However, in other cases, multiple tasks in a burst can be concurrently delegated, which can be useful when the tasks have a common synchronization point.

Similarly, a given application 704 can determine whether execution of a task 720 should be synchronous or asynchronous. That is, the application 704 can determine whether a process that issues the task 720 should wait (or block) for task results or can proceed with other operations pending task execution, including proceeding to issue other tasks, which can be related tasks (provided they are independent of other related tasks) or unrelated tasks. In some cases, a framework that implements virtual domains 712 can specify a burst size, or a maximum burst size.

In the scenario 700, a task 720 is submitted to the dispatcher 708 by a particular application 704 at 728. The dispatcher 708 can return a handle 732 to the application 704, which the application can use to access information about the task 720. For example, the application 704 can call a method (e.g., for an API associated with the dispatcher 708 or a framework that implements the scenario 700) to get the status of a task 720, to cancel a task, to change a priority level of a task, or to retrieve task results.

The dispatcher 708 can include a domain map (or configuration) 736. The domain map 736 can store the structure of the virtual domains 712 in the scenario 700, including notating which data structure instances are associated with a given virtual domain. The dispatcher 708 uses the domain map 736 to determine which virtual domain 712 should be sent a given task 720. The dispatcher 708 sends the task 720 to the appropriate virtual domain 712 at 738.

When a virtual domain 712 receives a task 720 from the dispatcher 708, the virtual domain can determine whether an inbox 740 defined for the virtual domain has a slot 742 available to receive the task. If so, the task 720 is assigned to an available slot 742. If a slot 742 is not available, the virtual domain 712 can take various actions, including queueing the task 720 or rejecting the task, where task rejection can be associated with a corresponding message sent to the dispatcher 708 or the application 704 that issued the task.

In particular implementations, specific slots 742 of the inbox 740 can be assigned to particular worker threads 746. When delegating a task at 738, the dispatcher 736 can consider a NUMA-distance to a client thread in determining into which slot 742 the task should be delegated. That is, if some worker threads 746 are associated with a processor that is closer to a processor hosting the client thread, the dispatcher 736 will prioritize assignment to that slot 742. However, if such an assignment is not currently possible (e.g., all slots 742 for close worker threads 746 are full), the task can be assigned to another slot.

Note that the inbox 740 can thus externally appear as a monolithic structure comprising the slots 742. However, as discrete slots 742 are assigned to particular threads 746, internally the inbox 740 appears as a collection of individual message buffer locations for the individual threads 746. The number of message buffer slots 742 for each thread 746 can be equal to the desired size for the inbox 740 divided by the number of threads.

Although other implementations of the inbox 740 are possible, such as having specific clients being assigned to specific inbox slots 742/threads 746, an advantage of the above technique is decoupling clients from particular threads. Thus, worker threads 746 are free to serve multiple clients, which can help workload balancing and optimization.

The virtual domains 712 include thread pools of one or more threads 746. As described, threads 746 can software computing threads mapped to hardware threads, where the mapping can be one-to-one or many-to-one, depending on implementation. Each thread 746 is typically responsible for a single task 720 at a time. The threads 746 retrieve tasks 720 from the slots 742 of the inbox and cause the tasks to be executed on the appropriate data structure instances 750 in the virtual domain 712. As has been described, a given virtual domain 712 can include a single data structure instance 750 or can include a plurality of data structure instances.

The thread 746 assigned to a task 720 receives execution results from the appropriate data structure instance 750. In some cases, the execution results can be stored in the slot 742 which received the task 720. In other cases, the slot 742 can store a pointer to a result buffer at a client. The slot 742 can include a status indicator (e.g., binary value, flag) indicating when results are available. If the slot 742 includes a pointer to a client results buffer location, the results can be store in the buffer for retrieval by the client.

In some cases, the application 704 which issued the task 720 checks the slot 742 to determine whether execution results are available. In other cases, the application 704 can be sent the execution results, or can be sent a notification that execution results are available to be retrieved. Slots 742 can be provided with timeout values, such as a slot being released if execution results have not been received within a determined time period, or after a determined time period after which execution results were made available to a client. That is, in various implementations, a client can affirmatively release a slot, can indirectly release a slot by retrieving execution results, or the slot can be released without client action.

In some cases, a thread 746 is assigned to a single virtual domain 712. In other cases, a thread 746 can be assigned to a plurality of virtual domains, as shown in inset 760. As shown in inset 770, a given computing system can have an overall thread pool 772 of threads 774. The threads 774 can be hardware threads or software threads. A portion 776 of the thread pool 772 can be designated for use by applications 704, while another portion 780 can be designated for use by virtual domains 712 (and which may be further assigned to particular virtual domains to provide thread pools for the virtual domains). Thus, part of configuring a system that includes virtual domains 712 can include determining a number of threads to make available for application processes and a number of threads to assign to virtual domains.

Example 9—Example Interface for Implementing Virtual Domains

Figure 8:
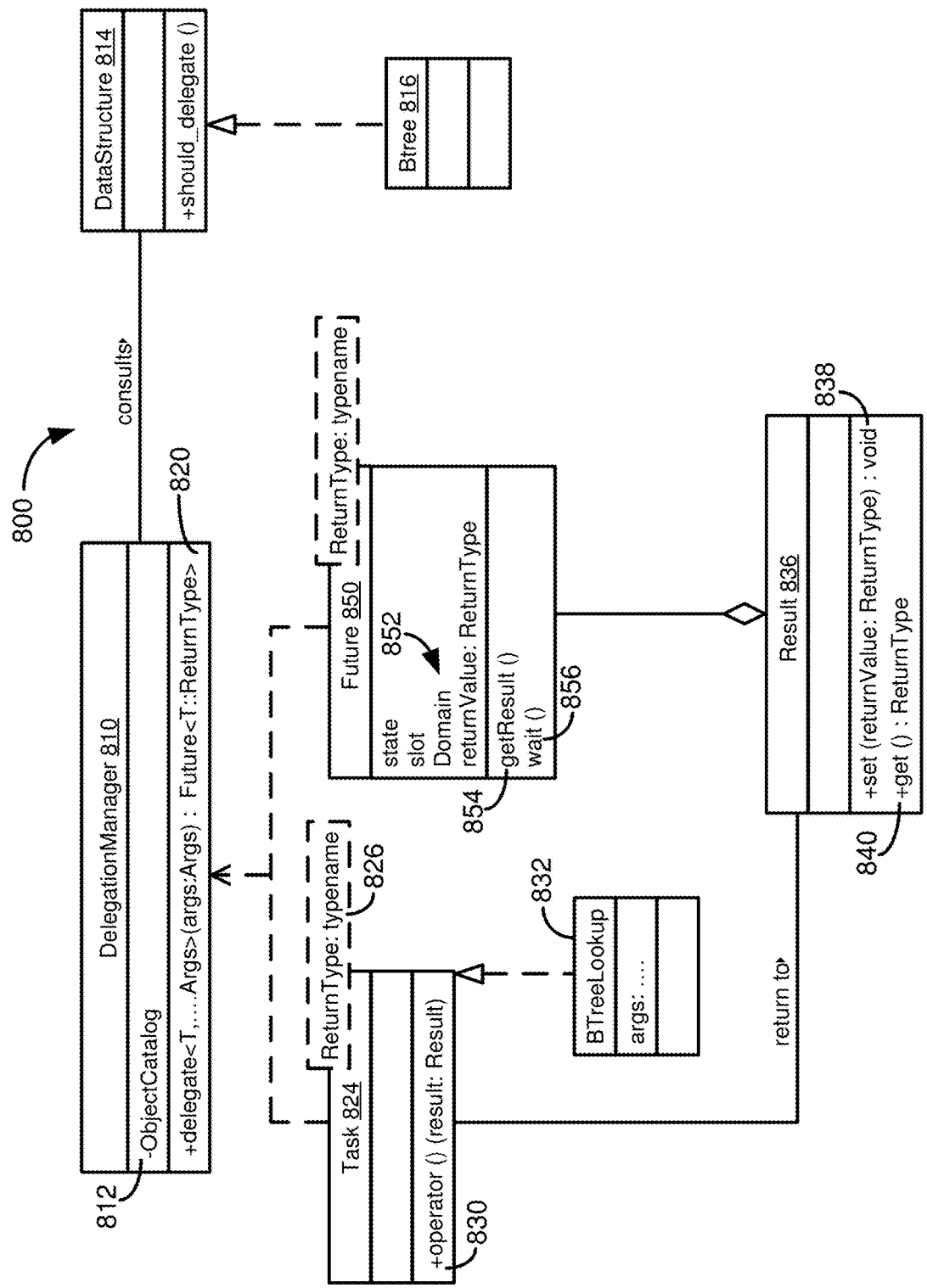
FIG. 8 is a class diagram for an interface for implementing virtual domains.

FIG. 8 provides a class diagram 800 for an interface that can be used to implement virtual domains as described in Examples 1-8. A DelegationManager class 810 includes a data member 812 for an object catalog (e.g., the domain map 736 of FIG. 7), which can consult a DataStructure class 814, that is associated with particular data structure instances/implementations, such as an index implemented as an instance of a BTree class 816.

The DelegationManager class 810 can include a method 820 for delegating tasks to a particular virtual domain/data structure. The method 820 can be templated or otherwise defined to accommodate different task types and different return types. In particular, return types can include primitive data types, but can also include composite or abstract data types (for example, returning a pointer to a composite or abstract data type).

A Task class 824 can be templated, including for a particular ReturnType 826. An operator method 830 can be called by a particular operation, such as class 832 that implements a lookup operation on a B-Tree. During runtime, the method 830, or a method of the class 832, can be called by worker threads in executing tasks on data structures on behalf of clients.

The operator method 830 can return an instance of a Result class 836. The Result class 836 can include a method 838 to set a value for an instance of the class and a method 840 to obtain the value of a particular instance of the Result class.

As discussed in Example 9, a virtual domain can include an inbox with slots, where a slot can receive a task and can hold task results. A slot in the inbox, particularly for receiving results, and from which results can be obtained, can be referred to as a future. The class diagram includes a definition for a Future class 850. The Future class 850 can be used to store information regarding the location of a slot assigned to a task, and to obtain information regarding the task/slot. For example, the Future class 850 includes data members 852 that store a state of the slot, a slot identifier, a virtual domain identifier, and a return type currently associated with the slot. The Future class 850 can include a method 854 for retrieving results from the slot and a method 856 for pausing operation of a client thread pending availability of task execution results.

The following code provides an example API for an asynchronous task that can be send to the appropriate virtual domain for execution:

```
class Task {
Task ( void * dataStructure /* , Args ... args */)
void operator ( )( Result & res );
};
```

Note that the first parameter of the constructor is the targeted data structure, which can be used, among other things, to determine what virtual domain should be sent the instantiated task. The operator function implements operations to be executed by a worker thread, on behalf of a client, on a given data structure of a virtual domain. Note also that the interface encapsulates the input parameters for the task (i.e., Args ... args).

The following code provides a specific example of a task that performs a lookup operation on a specified index:

```
template < typename Index , typename T>
class TaskGet {
    Index * _index ;
    T _key;
    TaskGet ( Index * index , T key ):
        _index ( index ), _key ( key ){ };
    void operator ( )( Result & res ){
        res . set ( _index -> lookup ( key ) );
    }
};
```

Note that this example task is comparatively simple. In some cases, tasks can be more complex, including having multiple operations for a single data structure or involving multiple data structures, so long as the multiple data structures are located in the same virtual domain.

Example 10—Example Virtual Domain Implementations

FIGS. 9A-9F provide pseudocode for various function that can be implemented in a virtual domain framework. FIG. 9A illustrates pseudocode 908 for a method of delegating a task. The method takes as arguments an identifier for a virtual domain that will receive a task, a type of the task (e.g., index lookup), and one or more additional parameters that can be associated with the task, including a task object. At line 2, the method reserves a slot in the inbox of the virtual domain. The reservation operation can return an error if a slot is not available in the inbox of the destination virtual domain. At line 3, the task and task parameters are written to the slot reserved in the inbox at line 2. At line 4, the method returns a result when the task has been executed.

FIG. 9B provides pseudocode 912 for a method of delegating multiple tasks, which can represent a burst of tasks provided by a particular application. The method takes similar arguments as the simple delegation method of the pseudocode 908, but also includes an argument for a number of slots to be reserved and a reference to a callback function. The pseudocode 912 reserves and populates slots in a similar manner as the pseudocode 908, but for each task in the batch of tasks. The pseudocode can then process tasks results as they become available using the callback function provided in the call of the function.

FIG. 9C provides pseudocode 916 for an internal function to manage the inbox of a virtual domain to send tasks to be executed in a virtual domain, such as in response to the calling of the future.emplace_task method of the pseudocode 908 of FIG. 9A. For example, a client can call the future.emplace_task method, and the send_message method can be called during execution of future.emplace_task. The pseudocode 916 allocates space in a buffer for the results of the task. The pseudocode 916 then assigns an inbox slot for the task into which it writes the task (including the arguments of the task) and a pointer to a previously allocated results buffer. Once the task has been written, the pseudocode 916 then sets a flag indicating that a task is available to be executed in the virtual domain. Once task results are available, the slot is flushed and the slot is returned to a pool of available slots (which, in the pseudocode 916, is implemented as a stack) and the result in passed from the results buffer.

FIG. 9D provides pseudocode 920 for managing the receipt of tasks in an inbox of a virtual domain. The pseudocode 920 describes an ongoing process of scanning the slots of an inbox to determine whether a task has been assigned to an inbox slot. If so, the task is processed and the result, when available, is sent by writing the result into the appropriate location of the results buffer.

FIG. 9E provides pseudocode 924 for initializing a delegation of a batch of tasks that are to be delegated to multiple virtual domains. The method defined by the pseudocode 924 takes as arguments the identifiers of the virtual domains to which the tasks will be sent and a size for the batch. The method attempts to reserve slots in the referenced virtual domains. If successful, a pointer to a memory location where each task result can be obtained is returned (e.g., to an application, which can then use the reference to access the memory location with the tasks results when task results are available). FIG. 9F provides pseudocode 928 for deinitializing handles associated with tasks, and involves releasing slots associated with the tasks and freeing memory that stored task results.

Example 11—Example Configuration Selection for Virtual Domains

In some implementations, a virtual domain can be defined, or configured, by assigning the virtual domain a set of one or more logical (SMT) processing cores (one or more of which can optionally be shared with one or more other virtual domains), a worker thread management policy (e.g., if worker threads are pinned to the virtual domain or can migrate to other virtual domain, which virtual domains may optionally also be specified), and a memory access policy (e.g., whether memory is assigned to individual workers or whether memory is not assigned to individual workers). Note that since operations on a data structure are restricted to the virtual domain of the data structure, cache coherence issues are restricted to those processing cores that are assigned to the virtual domain.

In some cases, qualitative metrics can be gathered about a system (e.g., workload, hardware, data structures) and used to configure virtual domains. Typically, an application determines if multiple instances of a data structure are to be used, and then a virtual domain configuration process determines how to best configure virtual domains for such multiple instances. However, in other cases, a configuration process can determine when multiple instances of a data structure may be beneficial, and can either automatically create such new instances or can provide a notification to a user to consider creating new data structure instances.

In a particular example, a test workload can be executed using progressively larger domain sizes. Throughput can be measured as virtual domain size increases. Typically, throughput will increase up until a certain domain size, after which performance decreases (i.e., the slope of size versus throughput becomes negative). The virtual domain size at the inflection point is typically selected as the optimum virtual domain size. Note that while this process describes increasing domain size, a similar optimization process can be conducted by placing different data structures in different domains—for example, evaluating throughput using a single data structure and different combinations of multiple data structures. Permutations of data structures can be evaluated along with permutations of virtual domain size (e.g., data structure A with one core, two cores, three cores, etc., data structure A with data structure B and one core, two cores, three cores, etc.).

Heuristics can be used to help reduce a number of configurations to be evaluated, or to select a particular configuration. For example, it may be known that certain data structures or workloads typically perform better with larger or smaller domains (e.g., larger domains can be preferred for read-heavy workloads and smaller domains preferred for write-heavy workloads). Similarly, it may be known that some types of data structures can typically be combined with other data structures and provide good throughput, while other types of data structures may exhibit better performance when not combined with other data structures.

Note that having multiple data structures in a domain decreases contention for any given data structure in the domain. However, performance can decrease for other reasons when multiple data structures are included in a single virtual domain, such as it being less likely that data for a given data structure will remain cached, and that cache coherence issues can increase if multiple processor caches are included in the virtual domain.

Workloads can be classified by the types of statements included in the workload, such as an OLTP workload that is mostly write operations (OLTP-1), an OLTP workload that includes a mix of writes and read-update statements (OLTP-2), and a hybrid transaction/analytical processing (HTAP) workload that includes writes, read-updates, and read-only statements.

For some workloads, such as OLTP-1, homogenous filing of domains may result in optimal virtual domains. In homogenous filling, there is a single optimal domain size for all data structure instances. The homogenous filling can in some ways be similar to a shared-nothing partitioning strategy, but can still be beneficial over prior techniques in that a variable number of processing cores, independent of the underlying hardware, can be assigned to virtual domains (e.g., four sockets or only half a socket).

Other types of workloads, such as OLTP-2 and HTAP, may benefit from heterogenous filling, which can be subdivided into isolated filling and shared filling. Isolated heterogenous filling can be beneficial when one or more data structures may benefit from being isolated in a virtual domain (i.e., being the only data structure in the virtual domain). For example, it can be beneficial to isolate a lock manager or a heavily used index in order to provide predictable performance, or to increase performance. In shared heterogenous filling, multiple data structures can be assigned to a single virtual domain. Note that isolated and shared approaches can be applied in a single system configuration—such as having some virtual domains with a single data structure and other virtual domains having multiple data structures, where different virtual domains having multiple data structures potentially have different numbers or types of data structures assigned to a virtual domain, as well as having different virtual domains being assigned different amounts of computing resources.

For shared heterogeneous filling, the problem can be formulated as a variation of a General Assignment Problem with Minimal Quantities (GAP-MQ) in form of an Integer Linear Program (ILP). The ILP should fulfil the following goals: (1) data structure instances should not be placed in domains that exceed the optimal domain size of a given data structure instance; (2) the number of domains should be minimized because a higher number of domains increases the sensitivity to skew; (3) the load between all domains should be balanced. Based on these goals, the ILP can be formulated as follows.

n data structure instances are introduced with calibrated optimal domain sizes $O=O_1, \ldots, O_n \in \mathbb{N}^+$ and the total count of worker threads in the system as constant C to this variation of the GAP-MQ. The union of the powerset of the optimal domain sizes is then considered as all possible choices of domains for a configuration, i.e., $B = \cup \mathbb{P}(O)$ with $m = |B|$.

Moreover, for load balancing an abstract expected load is assigned as weight $w_i \in \mathbb{R}^+$ for each data structure instance where $0 \leq w_i \leq 1$. Furthermore, an application can specify a minimum and maximum load of a domain j with $q_j, r_j \in \mathbb{R}^+$ (where $q_j \leq r_j$, $\forall j \in \{1, \ldots, m\}$). Setting a minimum load per domain is used to avoid domains without any load while the maximum load avoids overloading domains. Finally, selection of larger domains is incentivized by assigning the profit in proportion to the domain size as $p_j = B_j^P$ (for a large P where $p_1 \ll \ldots \ll p_j$, $\forall j \in \{1, \ldots, m\}$).

$$\max \sum_{i=1}^{n} \sum_{j \in S} p_i x_{i,j} \quad (1)$$

$$\text{s.t.} \quad \sum_{j \in S} x_{i,j} = 1 \qquad \forall\, i \in \{1, \ldots, m\} \quad (2)$$

$$B_j x_{i,j} \leq O_i \qquad \forall\, i \in \{1, \ldots, m\}, \forall\, j \in S \quad (3)$$

$$\sum_{j \in S} B_j x_{i,j} \leq C \quad (4)$$

$$q_j \leq \sum_{i=1}^{n} w_{i,j} x_{i,j} \leq r_j \quad \forall\, j \in S \quad (5)$$

$$x_{i,j} \in \{0, 1\} \qquad \forall\, i \in \{1, \ldots, m\}, \forall\, j \in S. \quad (6)$$

Equations 1-6 formulate the ILP for the configuration problem based on the GAP-MQ problem. First is the objective function which formalizes an optimal configuration as the assignment $x_{i,j}$ of data structure instances i to a subset of domains $j \in S$, maximizing the profit through large domain sizes, and consequently minimal number of domains. The constraint in Equation 2 requires the assignment of each instance to exactly one domain. Equation 3 constrains the assignment of an instance to domains of at most the calibrated optimal domain size to satisfy the calibrated worst-case contention and locality while Equation 4 restricts the choice of domains to the capacity of the given hardware. Finally, in equation 5 the assignment of instances is constrained to domains, such that the sum of the load of a domain is within the required bounds. Solving this ILP creates a configuration for a runtime system. Moreover, this ILP can easily reflect application-specific requirements on the configuration through additional constraints. For example, further constraints can implement co-location of specific data structure instances to place dependent indexes into the same domain.

Example 12—Example Virtual Domain Configuration and Performance Evaluation

Evaluations were conducted to show how the inherent concurrency limits of common database data structures affect scalability and evaluate how scale-up and scale-out with disclosed virtual domain techniques, including task delegation can provide robust scalability with individually optimal configurations. Three settings were considered: Shared Everything, NUMA-allocated and Opt-Sized Deleg.

Shared Everything represents a shared-everything setting, where all threads access a single data structure instance that is not NUMA-aware. NUMA-allocated represents an optimized baseline setting, where the data structure is hash partitioned into socket-resident partitions. Therefore, this NUMA-allocated setting is NUMA aware for memory allocations of the individual partitions and synchronization is limited to a single partition. However, all threads are still allowed to operate on all the partitions, i.e., execution is not NUMA aware. Finally, Opt-Sized Deleg. represents the virtual domain framework and delegation with bursting on top.

Evaluations were conducted on an HPE MC990X system with two hardware partitions each containing four Intel Xeon CPU E7-8890 v4 (24 cores, 60 MB L3), i.e. 192 physical cores and 384 SMT cores (with HyperThreading) in total. A NUMAlink controller combines these hardware partitions as a single, cache-coherent NUMA system. The resulting system has four levels of NUMA, as listed in the table shown in FIG. 10, which allows the dramatic effect of NUMA on scalability to be demonstrated.

For all evaluations, except where explicitly stated, scalability was assessed in terms of system size, i.e., number of SMT cores. The following scaling steps were considered: half-a-socket, one, two, four, and eight sockets. For each stepping, all available SMT cores were used, i.e., 48 for one socket, 96 for two sockets, etc. To avoid oversubscribing issues, scaling was limited to the number of SMT cores. For the evaluation framework, SMT cores were divided between client and worker threads according to an optimal ratio which was determined offline for each data structure. Furthermore, the size of a virtual domain was determined based on the first inflection point of the baseline scalability curve, i.e., the number of threads at which the speedup slope sharply decreases. The resulting virtual domains are depicted as alternating white and gray shading in the data plots, where each shading represents one additional domain.

The framework was operated with three different burst sizes, 14, 112, and 896, but, for the sake of conciseness, only the performance of the best performing burst size per scaling step is reported. Burst size is a parameter that can be dynamically adapted to the running workload.

To assess scalability, the Yahoo! Cloud Serving Benchmark (YCSB) was used. Workloads used were: A (Read-Update 50/50), C (Read-Only), and D (Read-Insert 95/5) of YCSB. These workloads allow scalability to be observed with increasing contention due to the varying amount of modifications. The distribution of workload D was changed from Latest to Zipfian to keep the distribution of records and operations identical across all three workloads. Moreover, records of 64-bit integer keys and values were used, which potentially allows more caching but also may cause higher contention. This allows the evaluation of complex effects of locality and contention in both software and hardware.

The number of records was defined as ten times the cumulative last level cache size of all sockets in the system, i.e. 314M records. The complete workload, records and operations, was generated through the official Java implementation, which was then replayed during execution of C++ based prototypes. Two million operations per thread were executed; thread count includes both clients and workers for the Opt-Sized Deleg. configuration, i.e., all settings execute the same number of operations.

Measurements are presented as the median out of seven executions. The reliability of measurements was assessed in terms of Coefficient of Variation (CV) (ratio of standard deviation to mean). A CV $\Leftarrow$5% was considered as reliable.

The scalability of plain atomic counters which are commonly used for generating timestamps in DBMS were evaluated. The evaluation was implemented as a static array of atomic counters with 128 byte alignment per counter to prevent any false sharing. The executed operation in this evaluation was a simple fetch-and-add, which was wrapped in a task. When compared to complex data structure synchronization, an atomic counter is cheap, as it consists of a single instruction. However, contention on these counters can be very high; timestamps consist only of a few atomic counters that are concurrently accessed by a large number of threads. Therefore, scalability was assessed in low, medium, and high contention scenarios with 512, 32, and 8 atomic counters, respectively.

Another goal of the evaluations was to assess the inherent properties of the framework, i.e., with tasks comprising very little work, hence stressing the scalability of the framework. FIG. 11 depicts operation throughput in this evaluation.

Starting with a small thread count and low contention, both baseline settings (Shared Everything & NUMA-allocated) provide excellent throughput, but only up to 48 threads, i.e., the socket boundary. Throughput sharply drops for larger thread numbers operating across several sockets. Therefore, 48 threads was defined as the virtual domain size. In contrast to the baseline, the framework starts off with a comparatively low throughput for few threads and low contention (0.25× of Shared Everything), but it is able to robustly scale to many threads regardless of the level of contention (up to 6.3×). This robustness establishes a trend of increasing improvement over the baseline: the larger the scale the better the improvement.

FIG. 12 shows different hardware metrics for the atomic counters evaluation, namely the number of instructions, instructions per cycle (IPC), and local (in contrast to remote socket) L3 misses per instruction. Despite the seemingly high overhead of about 10× more instructions per operation (FIG. 12, panel a), the disclosed framework achieves robust scalability through high locality and high efficiency due to the abstraction provided by virtual domains and in-memory messaging. FIG. 12, panel b, shows this high efficiency: the framework maintains an IPC close to one while the IPC of the baselines is up to two orders of magnitude lower. FIG. 12, panel c, demonstrates the improved locality.

The disclosed framework exhibits over one order of magnitude less local L3 cache misses per instruction than the baselines. Although the atomic counters completely fit in the L2 cache, cache misses occur due to competition between CPU cores for exclusive access to the cache line containing an atomic counter. This competition causes frequent transfer of the atomic counters between cores, and worse, sockets. Consequently, every transfer inadvertently prolongs the execution of the seemingly efficient fetch-and-add instruction. This communication latency increases with increasing system size, prohibiting scalability for the baseline settings. The disclosed framework is able to lift this shortcoming, thereby enabling robust scalability across all contention levels.

The framework was also evaluated with a set of data structures with different synchronization mechanisms (listed in the table shown in FIG. 13) commonly used for indexing in data management systems. The evaluation ranges from very favorable settings for the baseline, i.e., small scale read-only with minimal synchronization, to large scale with mixed workload.

Figures 13, 14, 15:
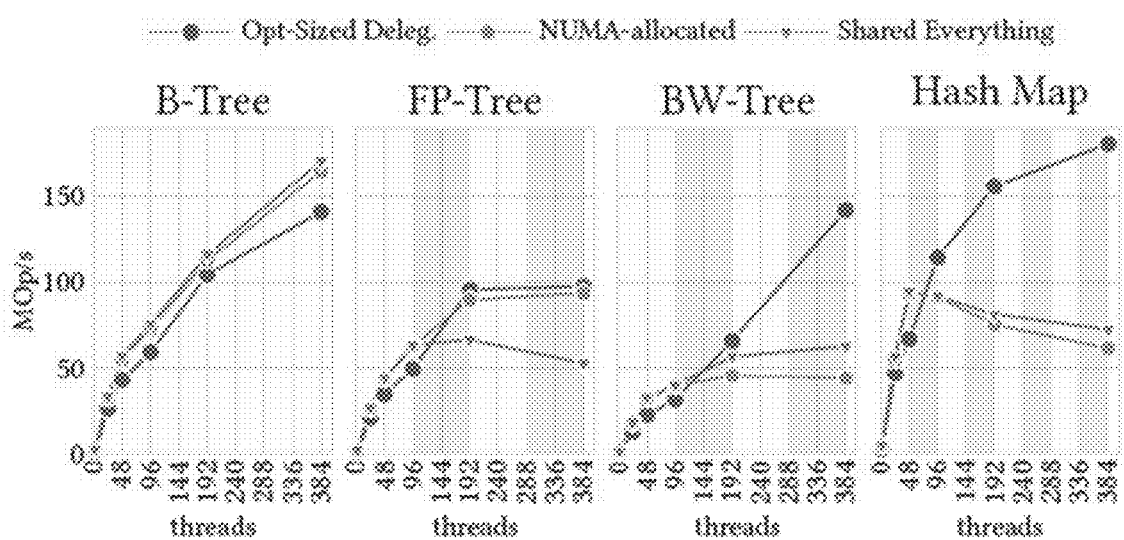
FIG. 13 is a table describing index data structures used for various evaluation scenarios.
FIG. 14 is a table describing domain size, in threads, for various index structures used in various evaluation scenarios.
FIGS. 15 and 16 provide graphs of throughput for evaluation workloads executed on different index structures using various evaluation scenarios.

The table shown in FIG. 14 shows the sizing of virtual domains, derived offline, of the disclosed framework for every combination of data structure and workload. The resulting virtual domains are illustrated with alternating white and gray shadings in the plots, e.g., the first shading represents one virtual domain, the second shading represents two virtual domains, etc.

An evaluation was conducted to examine the scalability of the read-only workload, YCSB C. This evaluation is very favorable for Shared Everything, as there is little to no contention, allowing maximal opportunity for high cache utilization. Therefore, the benefits of the disclosed framework may be limited and outweighed by its overhead. Nevertheless, although the workload is read-only, a general-purpose implementation comprising reader writer synchronization primitives may force readers to coordinate, causing contention that the disclosed framework can largely mitigate.

FIG. 15 depicts the results of this evaluation. B-Tree, which employs no synchronization primitives for reads, performs well up to the largest scale of 384 threads in the Shared Everything setting. The overhead of NUMA-allocated for B-Tree is negligible with a performance penalty below 5%. The disclosed framework was not able to amortize its intrinsic overhead with B-Tree and the read-only workload. The performance penalty of the disclosed framework ranges from 50% with two threads to <20% with several sockets.

For FP-Tree, the Shared Everything setting scales only up to 96 threads (2 sockets). At the larger scale of 4 sockets performance stagnates and then degrades for 8 sockets. NUMA allocated and Opt-Sized Deleg. perform on par with Shared Everything until 2 sockets and manage to scale further to 4 sockets, only stagnating at 8 sockets. Their throughput improvement over Shared Everything is 1.76× and 1.84× at 8 sockets, respectively.

Interestingly, basic hardware metrics for Shared Everything and NUMA-allocated are similar despite the significant difference in their exhibited throughput. The reason behind this difference is found in FP-Tree's synchronization mechanism that relies on HTM and falls back to a global read write lock when too many HTM transactions abort. This has two shortcomings: (1) being contained in the L1 cache, larger HTM transactions are likelier to abort on larger systems with larger datasets, e.g., due to cache associativity conflicts; and (2) the fallback mechanism (global lock) is less efficient the larger the system is. The NUMA-allocated setting can mitigate both shortcomings.

The performance of both baseline settings for BW-Tree is contrary to that of FP-Tree. Simple partitioning shows negative effects, such that NUMA-allocated performs worse than Shared Everything with a gap of up to 30% in operation throughput. In contrast, the disclosed framework starts off with the same slow down for a few sockets as for the FP-Tree, but manages to scale nearly linearly with the increasing number of sockets, reaching 2.26× higher throughput than Shared Everything at 8 sockets. Measurements of the interconnect traffic evidenced that the disclosed framework achieves this improvement through tight control of interconnect communication with a constant volume per operation, whereas the communication volume continuously grows for the baseline settings, reaching nearly double the volume at 8 sockets. This control of communication is only achievable through tight control of the execution flow with the virtual domains and message based delegation. Partitioning and NUMA-aware pinning of memory in NUMA-allocated setting does not address this issue, because its thread execution is not NUMA-aware.

Finally, Hash Map scales only up to a single socket without the framework of the present disclosure. With the disclosed framework it scales well to 8 sockets, reaching 2.49× higher throughput than Shared Everything. This significant improvement is because the bottleneck of the general-purpose implementation of the Hash Map lies in the reader coordination of the reader-writer mutex for synchronization on the hash buckets. The locality within virtual domains optimizes the execution of the atomic increment to register readers on the mutex, similar to the earlier experiments on atomic counters. The disclosed framework performs reasonably well on the disadvantageous read-only workload at larger scales and is beneficial for reader coordination. For small scale read-only workloads the disclosed framework may not be beneficial.

The impact of updates on the same indices was assessed with an equal mix of reads and updates. The updates are in-place modifications of only the records in the index, which do not require any restructuring of the index, such as node splits in a tree. Thus, these are very localized modifications providing opportunity for low contended, efficient synchronization. However, the high number of updates will pressure synchronization and will cause physical contention.

Figure 16:
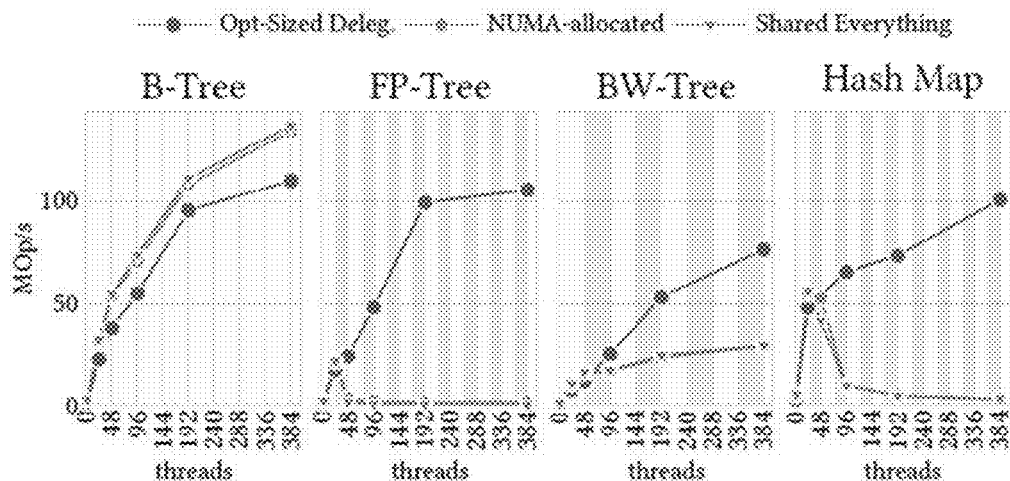

FIG. 16 depicts the throughput of the read-update workload for the same four index data structures as in the previous evaluation. The disclosed framework provides robust scalability on the read-update workload for the all data structures. Whereas, only the B-Tree and BW-Tree scale in the baseline settings, B-Tree scales the best in all three settings. The simple synchronization with just atomic operations on the record utilizes the potential of low contention, such that the disclosed framework does not add further benefits (0.49×-0.86× improvement). However, this synchronization does not reflect modifications of the structure of the BTree. Therefore, B-Tree merely designates an upper bound for possible performance and actually points out the remarkable performance the disclosed framework with the FP-Tree.

The FP-Tree achieves an improvement of 444.38× at 384 threads with the disclosed framework, since both baseline settings do not scale beyond 24 threads and degrade already at 48 threads still in the same socket by over 90%. The disclosed framework scales far better because it retains the scale-up performance of 24 threads in virtual domains and efficiently scales these out. In detail, the causes for the heavy performance degradation and missing scalability are tied to the sensitivity of HTM to high conflict in the workload (i.e., 50% updates) and length of HTM transactions including amplification due to longer NUMA distances. The result is the high abort rate of HTM transactions for Shared Everything and NUMA-allocated inflicting the heavy performance degradation. The low abort rate for FP-Tree with the disclosed framework confirms the benefit of strictly isolated execution within virtual domains.

Figure 17:
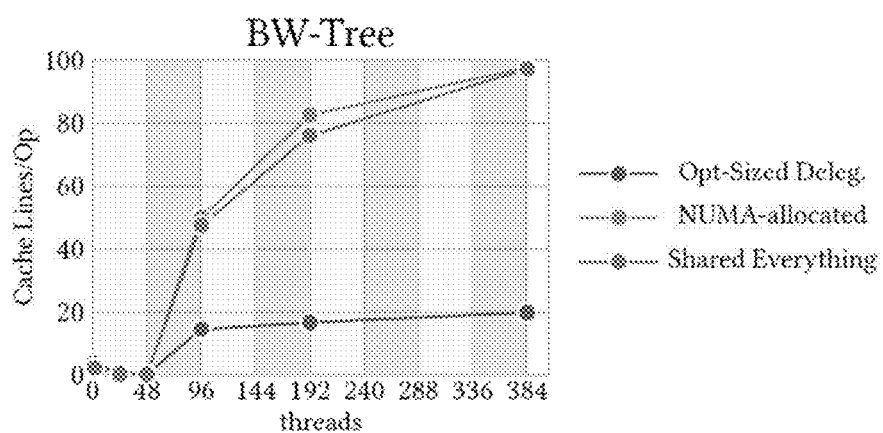
FIG. 17 is a graph illustrating communication volume on socket interconnects for a BW-Tree index structuring using the workload of FIG. 16.

BW-Tree manages to scale with the baseline settings due to its conflict resistant Copy-On-Write (COW) synchronization scheme but the performance of the disclosed framework is far superior at larger scales, i.e. up to 2.68×. FIG. 17 shows that the COW synchronization scheme induces a high communication overhead of 48 to 97 cache lines per operation on the interconnects. Here, the efficient in-memory messaging of the disclosed framework pays off with about 5 times less communication volume, i.e., 9 to 20 cache lines per operation. Finally, Hash Map exposes similar behavior of the baseline settings as FP-Tree. With 24 threads it provides excellent performance, even better than the B-Tree. But, beyond 24 threads, it heavily degrades. In contrast to FP-Tree, Hash Map has its bottleneck in the synchronization of the hash buckets but does not impose high communication volume on the interconnects.

The disclosed framework provides robust scalability for indices under high contention. While NUMA-allocated and even Shared Everything achieve good performance at small scale, both of these approaches heavily suffer beyond a single socket. The disclosed framework effectively contains contention and provides locality in virtual domains as well as efficiently communicates between these at any scale. Therefore, the disclosed framework robustly scales out the good performance of the indices at small scale resisting increasing contention.

Figure 18:
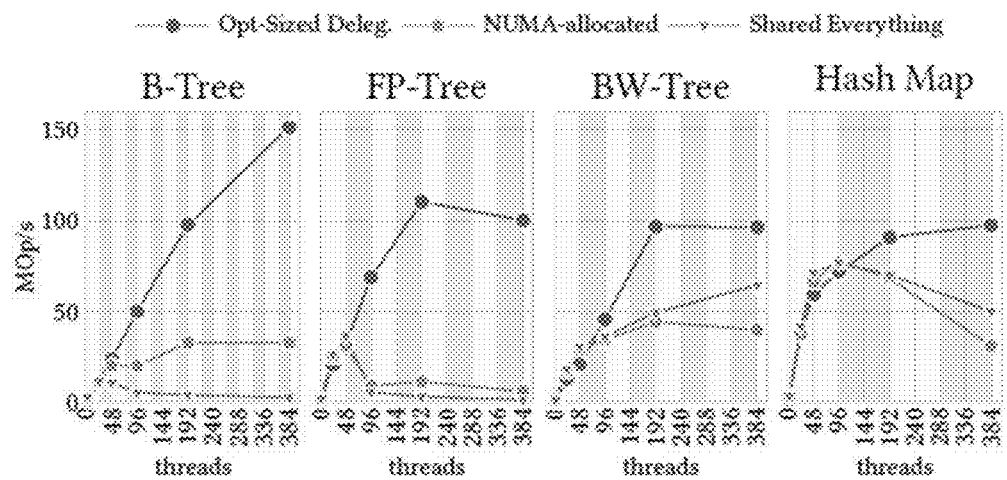
FIG. 18 is a graph of throughput for an evaluation workload executed on different index structures using various evaluation scenarios.

Another evaluation, on scalability of index data structures, considered structural modifications due to inserts, which are more challenging modifications than in-place updates. Since updates already heavily impact scalability, evaluations were conducted with 95% reads and only 5% inserts instead of an equal mix. The observations in FIG. 18 are very similar to the previous two evaluations. The disclosed framework robustly scales with all data structures. Regarding Shared Everything and NUMA allocated, FP-Tree still heavily degrades due to high HTM aborts, but BW-Tree and Hash Map handle the fewer modifications more efficiently resulting in performance between read-only and 50/50 read-update.

The disclosed framework provides robust scalability for the exemplary index data structures. It effectively isolates contention stemming from point modifications or structural modification such as in-place updates or inserts into indices. Thereby, the indices in the disclosed framework with virtual domains achieve predictable performance, while performance of Shared Everything and NUMA allocated highly fluctuate.

In previous evaluations, each scaling step adds sockets for execution, inextricably increasing the complexity of NUMA effects. To better understand the impact of these NUMA effects, computing resources in this evaluation were limited to a single socket and place the index on a single, potentially different socket. For the Shared Everything and the NUMA-allocated settings, the memory of the index was pinned to a socket and the worker threads to another, increasingly farther socket. For the disclosed framework, the NUMA distance was increased between the threads issuing tasks (i.e., clients) and the virtual domain containing the index and the worker threads—worker threads are co-located by design with the index. In all settings, the number of threads was set to 48, i.e., threads of a single socket, and client threads (all for Shared Everything and NUMA-allocated) were pinned to a fixed socket.

Figure 19:
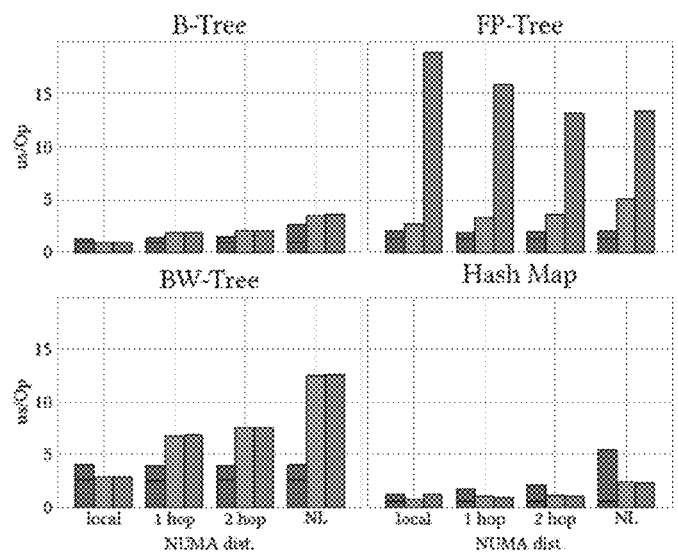
FIG. 19 provides graphs showing time attribution of a workload on various index structuring with increasing NUMA distance.

FIG. 19 displays the time in microseconds per operation for the read-update workload with increasing NUMA distance. In the Shared Everything and NUMA-allocated settings, all index types are sensitive to NUMA effects, i.e., the time per operation increases with increasing NUMA distance. However, the degree of NUMA sensitivity varies depending on the data structure. For B-Tree, BW-Tree, and Hash Map slowdown is directly proportional to the increase in memory access latency (see FIG. 10). The FP-Tree is, however, an exception.

While, the NUMA-allocated setting behaves similarly to the aforementioned data structures, the shared everything setting behaves inversely proportional to increasing NUMA distance. This behavior is due to conflicts in synchronization with HTM. These HTM conflicts are limited in the NUMA allocated setting since concurrency is limited to partition boundaries. In contrast, the delegation approach used with the disclosed framework demonstrates that the execution time of the index operations stays constant and is independent of the NUMA distance—only the overhead of the framework varies. This observation demonstrates that the isolation of data structures instances (partitions) provided by virtual domains provides improved performance. The upper part of the bars for delegation represents the framework's overhead on top of the index operation, which indicates three major insights. For local operations shared everything is more efficient than the disclosed framework, which is expected given that local shared everything is equivalent to the disclosed framework but avoids its overhead. The disclosed framework can perform independent of NUMA distance, as the constant time per operation for FP-Tree and BW-Tree show. The effect of NUMA distance on the disclosed framework is influenced by the type of data structure inside the virtual domain.

The FP-Tree results underline the disclosed framework's capability to isolate contention not only by partitioning the data structure, but also by limiting the number of participants in synchronization. Indeed, even for local operations the reduced number of threads accessing the same instance (i.e., all threads for the baselines vs. worker threads dedicated to a virtual domain) improves performance.

The prior evaluations demonstrated that the disclosed framework provides robust scalability in terms of throughput under increasing system size for a range of data structures and workloads. Having established robustness in system size, a data management application running on the disclosed framework in a large system likely creates many data structure instances. The expectation is that the aggregated throughput of the disclosed framework should be independent of the number of instances and individual configuration of diverse instances bolsters aggregated throughput under workload skew.

The robustness of throughput under increasing number of identical instances was investigated, which relates to the common use case of indices on partitioned tables for data management applications. The main purpose of this evaluation was to identify any major bottlenecks inherent in the data structures and the disclosed framework, since important performance factors such as cache locality or contention relate to the number of instances. In the following evaluation, a parameter set was taken from the prior evaluation, i.e., YCSB workload A (50/50 Read-Update) and largest system scale (8 sockets), and two different index types (FP-Tree, Hash Map) were used. The throughput for the increasing number of indices was observed, where the number of indices was increased by separating the single index of the prior evaluation into 8 to 512 indices.

Figure 20:
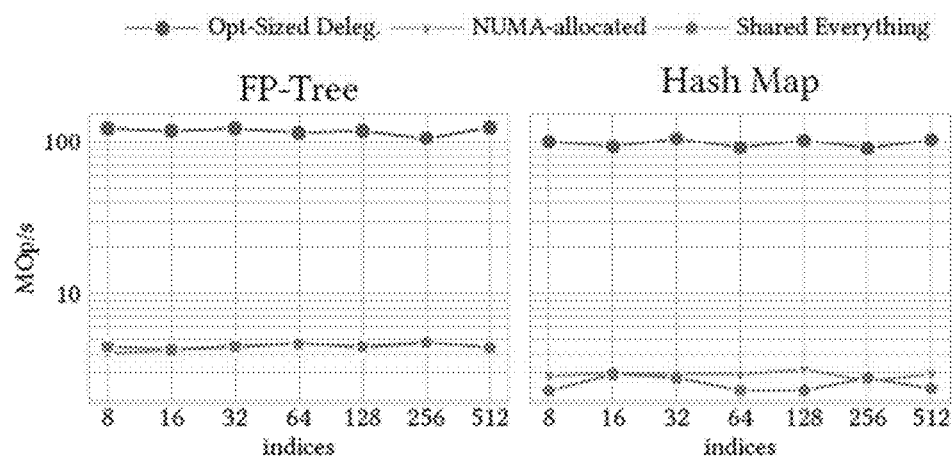
FIG. 20 provides graphs illustrating throughput for various index structures with increasing numbers of identical indices for various evaluation scenarios.

For these many indices, the disclosed framework was configured with the same number of optimally sized virtual domains, i.e., 24 threads each, identical to the prior evaluation, but additionally this evaluation 'co-locates' several instances within a single domain. FIG. 20 displays nearly constant throughput between 8 and 512 indices for most combinations of data structures and settings (CV<5%). The Hash Map in Shared Everything and Opt-Sized Deleg. settings exposes variation for this evaluation with a CV of 11% and 6% respectively, which is attributed to the lack of robustness of the Shared Everything setting and dependency of the hash function on the size of the Hash Map.

In comparison to a single index, the increased number of indices improves throughput of the FP-Tree by 20.7 MOp/s (0.14×) for Opt-Sized Deleg., 2.9 MOp/s (2.5×) for NUMA allocated, and 4.5 MOp/s (18.8×) for Shared Everything. For Hash Map, throughput does not significantly differ from a single index. The disclosed framework robustly scales with the size of an overlaying application in number of instantiated data structures. The overhead of delegation and virtual domains is independent of the overlaying application.

In addition to many index instances, data management applications may expose their indices to skew in the workload. For example, for Hybrid Transactional/Analytical Processing (HTAP) workloads write-heavy deltas and read-only indices are common. Such a scenario was taken as extreme case to assess the benefit of individual configuration and extend the previous evaluation of bottlenecks in regard to number of instances. This case was represented with read-only and update only twin indices based on the previous experiment.

An index was split into twins, which are both initialized with the same initial data set and afterwards read operations are directed to one twin index and updates to the other one. Since read and update operations exercise indices differently, the individual domain sizes were optimally configured for read-only and update-only instances, i.e., 48 and 24 threads. As comparison, the setting NUMA-Sized Deleg. was introduced for the disclosed framework with configuration according to state of the art NUMA aware applications, which pins memory and execution to specific sockets. The domain size of 48 threads for both index types realizes the bursted SOTA setting. For both settings with the disclosed framework, workers were evenly allocated to the index types according the 50/50 mix of read/update operations in the workload. Prior evaluations assumed an equal mix of operations (i.e., read, update, insert) on all index instances. Therefore, robustness was assessed against skewed workload in the following evaluation. The throughput of read and update operations in an extreme case where some instances are only read and other instances are only updated.

Example 13—Example Operations Using Virtual Domains

FIG. 21A is a flowchart illustrating operations 2100 for defining one or more virtual domains. The operations 2100 can be carried out, for example, using the architecture 600 of FIG. 6, and the technologies described in any of Examples 1-11.

At 2102, an amount of processing resources in a computing system is determined. One or more virtual domains are defined for the computing system at 2104. Each virtual domain includes a defined portion of the processing resources and one or more data structure instances. The defined processing resources can be specified as less than all of the processing resources available for a given processing socket of the computing system. The defined processing resources can also be specified as a portion of the processing resources associated with a plurality of sockets of the computing system. Processing resources assigned to a virtual domain are dynamically reconfigurable.

FIG. 21B is a flowchart illustrating operations 2120 for executing tasks in a computing environment that uses virtual domains. The operations 2120 can be carried out, for example, using the architecture 600 of FIG. 6, and the technologies described in any of Examples 1-11.

At 2122, an amount of computing resources in the computing environment is determined. The computing resources include a plurality of processor sockets. Each processor socket includes one or more processing cores. Each processing core includes one or more processing threads.

A first plurality of processing threads of the computing resources are allocated to a first virtual domain at 2124. At 2126, a second plurality of processing threads of the computing resources are allocated to a second virtual domain. A first data structure is instantiated in the first virtual domain at 2128, and a second data structure is instantiated in the second virtual domain at 2130.

A domain map is generated at 2132. The domain map includes identifiers of virtual domains in the computing environment and data structures instantiated in a given virtual domain. The domain map includes an identifier of the first virtual domain and an indicator that the first data structure is located in the first virtual domain. The domain map also includes an identifier of the second virtual domain and an indicator that the second data structure is located in the second virtual domain.

At 2134, a task is received that includes one or more operations to be performed on the first data structure. It is determined at 2136, using the domain map, that the first data structure is located in the first virtual domain. The task is sent to the first virtual domain at 2138. The task is executed using the first data structure at 2140. At 2142, task execution results resulting from executing the task are provided. In a particular example, task results are provided to a memory location provided in a request for the task.

FIG. 21C is a flowchart illustrating operations 2160 for reconfiguring a virtual domain. The operations 2160 can be carried out, for example, using the architecture 600 of FIG. 6, and the technologies described in any of Examples 1-11.

At 2162, an amount of computing resources in a computing environment is determined. The computing resources include a plurality of processor sockets. Each processor socket includes one or more processing cores. Each processing core includes one or more processing threads.

A first plurality of processing threads are allocated to a first virtual domain at 2164. A second plurality of processing threads are allocated to a second virtual domain at 2166. At 2168, a first data structure is instantiated in the first virtual domain. At 2170, a second data structure is instantiated in the second virtual domain. A plurality of tasks are executed at 2172 using the first data structure and the second data structure.

At 2174, the first virtual domain is reconfigured. The reconfiguring includes changing a number of threads assigned to the first virtual domain or changing at least one thread in the first virtual domain from a processing thread of a first processing core of the one or more processing cores to a processing thread of a second processing core of the one or more processing cores.

Example 14—Computing Systems

FIG. 22 depicts a generalized example of a suitable computing system 2200 in which the described innovations may be implemented. The computing system 2200 is not intended to suggest any limitation as to scope of use or functionality of the present disclosure, as the innovations may be implemented in diverse general-purpose or special-purpose computing systems.

With reference to FIG. 22, the computing system 2200 includes one or more processing units 2210, 2215 and memory 2220, 2225. In FIG. 22, this basic configuration 2230 is included within a dashed line. The processing units 2210, 2215 execute computer-executable instructions, such as for implementing the features described in Examples 1-12. A processing unit can be a general-purpose central processing unit (CPU), processor in an application-specific integrated circuit (ASIC), a field programmable gate array (FPGA), or any other type of processor, or combination of processors. In a multi-processing system, multiple processing units execute computer-executable instructions to increase processing power (and, if memory is directly connected to individual processing units, it can be referred to as a NUMA system). For example, FIG. 22 shows a central processing unit 2210 as well as a graphics processing unit or co-processing unit 2215. The tangible memory 2220, 2225 may be volatile memory (e.g., registers, cache, RAM), non-volatile memory (e.g., ROM, EEPROM, flash memory, etc.), or some combination of the two, accessible by the processing unit(s) 2210, 2215. The memory 2220, 2225 stores software 2280 implementing one or more innovations described herein, in the form of computer-executable instructions suitable for execution by the processing unit(s) 2210, 2215.

A computing system 2200 may have additional features. For example, the computing system 2200 includes storage 2240, one or more input devices 2250, one or more output devices 2260, and one or more communication connections 2270, including input devices, output devices, and communication connections for interacting with a user. An interconnection mechanism (not shown) such as a bus, controller, or network interconnects the components of the computing system 2200. Typically, operating system software (not shown) provides an operating environment for other software executing in the computing system 2200, and coordinates activities of the components of the computing system 2200.

The tangible storage 2240 may be removable or non-removable, and includes magnetic disks, magnetic tapes or cassettes, CD-ROMs, DVDs, or any other medium which can be used to store information in a non-transitory way, and which can be accessed within the computing system 2200. The storage 2240 stores instructions for the software 2280 implementing one or more innovations described herein.

The input device(s) 2250 may be a touch input device such as a keyboard, mouse, pen, or trackball, a voice input device, a scanning device, or another device that provides input to the computing system 2200. The output device(s) 2260 may be a display, printer, speaker, CD-writer, or another device that provides output from the computing system 2200.

The communication connection(s) 2270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Cloud Computing Environment

Figure 23:
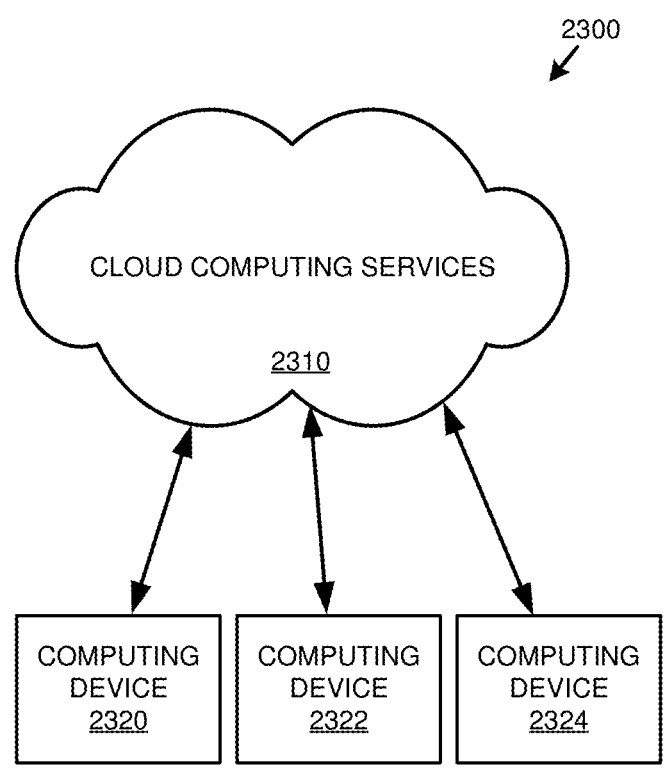
FIG. 23 is an example cloud computing environment that can be used in conjunction with the technologies described herein.

FIG. 23 depicts an example cloud computing environment 2300 in which the described technologies can be implemented. The cloud computing environment 2300 comprises cloud computing services 2310. The cloud computing services 2310 can comprise various types of cloud computing resources, such as computer servers, data storage repositories, networking resources, etc. The cloud computing services 2310 can be centrally located (e.g., provided by a data center of a business or organization) or distributed (e.g., provided by various computing resources located at different locations, such as different data centers and/or located in different cities or countries).

The cloud computing services 2310 are utilized by various types of computing devices (e.g., client computing devices), such as computing devices 2320, 2322, and 2324. For example, the computing devices (e.g., 2320, 2322, and 2324) can be computers (e.g., desktop or laptop computers), mobile devices (e.g., tablet computers or smart phones), or other types of computing devices. For example, the computing devices (e.g., 2320, 2322, and 2324) can utilize the cloud computing services 2310 to perform computing operations (e.g., data processing, data storage, and the like).

Example 16—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 22, computer-readable storage media include memory 2220 and 2225, and storage 2240. The term computer-readable storage media does not include signals and carrier waves. In addition, the term computer-readable storage media does not include communication connections (e.g., 2270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
one or more memories;
one or more hardware processing units coupled to the one or more memories; and
one or more computer readable storage media storing computer-executable instructions that, when executed, cause the computing system to perform operations comprising:
determining an amount of processing resources in the computing system;
defining one or more virtual domains for the computing system, each virtual domain comprising a defined portion of the processing resources and one or more data structure instances, wherein a first virtual domain of the one or more virtual domains comprises a first data structure instance having a first implementation and wherein the defined portion of the processing resources can be specified as (1) less than all of the processing resources available for a given processing socket of the computing system; or (2) a portion of the processing resources associated with a plurality of sockets of the computing system, and wherein processing resources assigned to a virtual domain are dynamically reconfigurable; and changing the first implementation to a second implementation.

2. The computing system of claim 1, the operations further comprising:

receiving a task from an application;

determining a data structure instance useable to execute the task;

determining a virtual domain of the one or more virtual domains that comprises the data structure instance useable to execute the task; and sending the task to the determined virtual domain.

3. The computing system of claim 2, wherein any given task comprises one or more operations for a single data structure instance of the one or more data structure instances.

4. The computing system of claim 2, the operations further comprising:

sending a handle to the application, the handle being useable to access task results.

5. The computing system of claim 2, wherein the receiving a task, the determining a data structure, the determining a virtual domain, and the sending a task are performed by a dispatcher that is in communication with the application and the one or more virtual domains.

6. The computing system of claim 5, wherein the dispatcher comprises a domain map of the one or more virtual domains and specifying in which virtual domain of the one or more virtual domains the one or more data structures instances are located.

7. The computing system of claim 2, wherein each virtual domain comprises an inbox comprising a plurality of slots, the operations further comprising:

receiving the task at the determined virtual domain in a slot of the inbox.

8. The computing system of claim 7, wherein processing resources for a given virtual domain of the one or more virtual domains comprise a plurality of threads, the operations further comprising, by a thread of the plurality of threads:

retrieving a task from a slot of the inbox; and executing the task using the data structure instance determined to be useable to execute the task.

9. The computing system of claim 8, the operations further comprising:

allocating memory in a results buffer for task execution results to provide allocated memory, the allocated memory associated with a memory address;

storing execution results in the allocated memory referenced by the memory address.

10. The computing system of claim 8, wherein a given slot of the inbox comprises a reference to memory comprising the task.

11. The computing system of claim 10, wherein a given slot of the inbox further comprises a reference to memory allocated for storing task execution results.

12. The computing system of claim 2, wherein the changing the first implementation to a second implementation does not require a change in the definition of a task to be performed using the second data structure implementation.

13. The computing system of claim 1, wherein the one or more virtual domains comprise at least a first virtual domain and at least a second virtual domain and the one or more data structure instances comprise first and second instances of a first data structure, the first instance of the first data structure being assigned to the at least first virtual domain and the second instance of the first data structure being assigned to the at least a second virtual domain.

14. The computing system of claim 1, wherein the one or more data structure instances are selected from instances of counters, indexes, lock managers, row stores, column stores, record version stores, logs, transaction tables, dependency graphs, or transaction queues.

15. The computing system of claim 1, wherein a first virtual domain of the one or more virtual domains comprises a first set of processing resources, the operations further comprising:

monitoring performance of workloads on the first virtual domain;

determining that the performance fails to satisfy a threshold; and automatically and dynamically changing the first set of processing resources.

16. The computing system of claim 1, wherein a first virtual domain of the one or more virtual domains comprises a first set of processing resources, the operations further comprising:

monitoring performance of workloads on the first virtual domain;

determining that the performance fails to satisfy a threshold; and receiving user input changing the first set of processing resources.

17. The computing system of claim 1, wherein a first virtual domain of the one or more virtual domains comprises a first set of processing resources, the operations further comprising:

monitoring a workload executed on the first virtual domain;

determining that the workload has changed from a first type to a second type; and automatically and dynamically changing the first set of processing resources based on determining that the workload has changed from the first type to the second type.

18. A computing system comprising:

one or more memories;

one or more hardware processing units coupled to the one or more memories; and one or more computer readable storage media storing computer-executable instructions that, when executed, cause the computing system to perform operations comprising:

determining an amount of processing resources in the computing system;

defining one or more virtual domains for the computing system, each virtual domain comprising a defined portion of the processing resources and one or more data structure instances, wherein a first virtual domain of the one or more virtual domains comprises a first data structure instance having a first implementation and wherein the defined portion of the processing resources can be specified as (1) less than all of the processing resources available for a given processing socket of the computing system; or (2) a portion of the processing resources associated with a plurality of sockets of the computing system, and wherein processing resources assigned to a virtual domain are dynamically reconfigurable;

receiving a task from an application;

determining a data structure instance useable to execute the task;

determining a virtual domain of the one or more virtual domains that comprises the data structure instance useable to execute the task;

sending the task to the determined virtual domain; and changing the first implementation to a second implementation, wherein the change from the first implementation to a second implementation does not require a change in the definition of a task to be performed using the second data structure implementation.

19. The computing system of claim 18, wherein a first virtual domain of the one or more virtual domains comprises a first set of processing resources, the operations further comprising:

monitoring performance of workloads on the first virtual domain;

determining that (1) the performance fails to satisfy a threshold or (2) the workload has changed from a first type to a second type; and based on the determining, automatically and dynamically changing the first set of processing resources.

20. A computing system comprising:

one or more memories;

one or more hardware processing units coupled to the one or more memories; and one or more computer readable storage media storing computer-executable instructions that, when executed, cause the computing system to perform operations comprising:

determining an amount of processing resources in the computing system;

defining one or more virtual domains for the computing system, each virtual domain comprising a defined portion of the processing resources and one or more data structure instances, wherein each virtual domain comprises an inbox comprising a plurality of slots and wherein the defined portion of the processing resources can be specified as (1) less than all of the processing resources available for a given processing socket of the computing system; or (2) a portion of the processing resources associated with a plurality of sockets of the computing system, and wherein processing resources assigned to a virtual domain are dynamically reconfigurable and wherein processing resources for a given virtual domain of the one or more virtual domains comprise a plurality of threads;

receiving a task from an application;

determining a data structure instance useable to execute the task;

determining a virtual domain of the one or more virtual domains that comprises the data structure instance useable to execute the task;

sending the task to the determined virtual domain;

receiving the task at the determined virtual domain in a slot of the inbox;

by a thread of the plurality of threads:
 retrieving a task from a slot of the inbox; and
 executing the task using the data structure instance determined to be useable to execute the task;

allocating memory in a results buffer for task execution results to provide allocated memory, the allocated memory associated with a memory address; and storing execution results in the allocated memory referenced by the memory address.

* * * * *